United States Patent
Li et al.

(10) Patent No.: US 11,231,711 B2
(45) Date of Patent: Jan. 25, 2022

(54) SYSTEMS AND METHODS FOR SURROUNDING INFORMATION ACQUISITION AND FEEDBACK FOR INTELLIGENT WHEELCHAIRS

(71) Applicant: SICHUAN GOLDEN RIDGE INTELLIGENCE SCIENCE & TECHNOLOGY CO., LTD., Sichuan (CN)

(72) Inventors: Jiaxin Li, Chengdu (CN); Yin Jiao, Gothenburg (SE); Li Yan, Gothenburg (SE); Dong Dong, Gothenburg (SE); Yifeng Huang, Gothenburg (SE); Weirong Liu, Beijing (CN)

(73) Assignee: SICHUAN GOLDEN RIDGE INTELLIGENCE SCIENCE & TECHNOLOGY CO., LTD., Chengdu (CN)

(*) Notice: Subject to any disclaimer, the term of this patent is extended or adjusted under 35 U.S.C. 154(b) by 216 days.

(21) Appl. No.: 16/476,317

(22) PCT Filed: Jan. 22, 2017

(86) PCT No.: PCT/CN2017/072104
§ 371 (c)(1),
(2) Date: Jul. 8, 2019

(87) PCT Pub. No.: WO2018/133077
PCT Pub. Date: Jul. 26, 2018

(65) Prior Publication Data
US 2020/0019164 A1   Jan. 16, 2020

(51) Int. Cl.
*G05D 1/00* (2006.01)
*B25J 5/00* (2006.01)
(Continued)

(52) U.S. Cl.
CPC ............ *G05D 1/0088* (2013.01); *B25J 5/007* (2013.01); *B25J 9/1666* (2013.01); *B25J 9/1697* (2013.01);
(Continued)

(58) Field of Classification Search
CPC .......... G05D 1/0088; G05D 2201/0206; B25J 5/007; B25J 9/1666; B25J 9/1697;
(Continued)

(56) References Cited

U.S. PATENT DOCUMENTS 9,672,446 B1\* 6/2017 Vallespi-Gonzalez ...................... G06K 9/00805
2013/0236107 A1 9/2013 Fukaya et al.
(Continued)

FOREIGN PATENT DOCUMENTS

| CN | 101190158 A | 6/2008 |
| CN | 102606398 A | 4/2011 |

(Continued)

OTHER PUBLICATIONS

International Search Report in PCT/CN2017/072104 dated Oct. 18, 2017, 7 pages.
(Continued)

*Primary Examiner* — Khoi H Tran
*Assistant Examiner* — Nhi Q Bui
(74) *Attorney, Agent, or Firm* — Metis IP LLC

(57) ABSTRACT

The present disclosure discloses the surrounding information collection, feedback system and method of the intelligent wheelchair. The system includes a processor, a movement module, and a holder, and the processor is configured to perform operations of receiving information, constructing a map, planning a route, and generating control parameters. The movement module executes the control parameters to move around and includes one or more sensors to detect the (Continued)

information. The holder includes one or more sensors to sense the information.

14 Claims, 21 Drawing Sheets

(51) Int. Cl.
*B25J 9/16* (2006.01)
*G01C 21/00* (2006.01)
*G01C 21/20* (2006.01)
*A61G 5/04* (2013.01)
*A61G 5/10* (2006.01)

(52) U.S. Cl.
CPC ............ *G01C 21/005* (2013.01); *G01C 21/20* (2013.01); *A61G 5/04* (2013.01); *A61G 5/10* (2013.01); *G05D 2201/0206* (2013.01)

(58) Field of Classification Search
CPC ........ G01C 21/005; G01C 21/20; A61G 5/04; A61G 5/10
See application file for complete search history.

(56) References Cited

U.S. PATENT DOCUMENTS

| | | | | |
|---|---|---|---|---|
| 2016/0070265 | A1* | 3/2016 | Liu | G01C 21/00 701/3 |
| 2016/0147230 | A1* | 5/2016 | Munich | G01C 21/206 701/28 |
| 2017/0206648 | A1* | 7/2017 | Marra | G01C 21/20 |

FOREIGN PATENT DOCUMENTS

| | | |
|---|---|---|
| CN | 102148934 A | 6/2011 |
| CN | 102188311 A | 9/2011 |
| CN | 102323819 A | 1/2012 |
| CN | 102631265 A | 8/2012 |
| CN | 103110485 A | 5/2013 |
| CN | 103414844 A | 11/2013 |
| CN | 104161629 A | 11/2014 |
| CN | 104869310 A | 8/2015 |
| CN | 105681747 A | 6/2016 |
| JP | 2004321722 A | 11/2004 |

OTHER PUBLICATIONS

The Second Office Action in Chinese Application No. 201780084265.3 dated Nov. 11, 2020, 14 pages.

* cited by examiner

SYSTEMS AND METHODS FOR SURROUNDING INFORMATION ACQUISITION AND FEEDBACK FOR INTELLIGENT WHEELCHAIRS

CROSS-REFERENCE TO RELATED APPLICATIONS

This application is a U.S. national stage under 35 U.S.C. § 371 of International Application No. PCT/CN2017/072104, filed on Jan. 22, 2017, designating the United States of America, the entire contents of which are incorporated herein by reference.

TECHNICAL FIELD

The present disclosure relates to systems and methods for surrounding information collection and feedback for an intelligent wheelchair. Specifically, the present disclosure relates to control methods for a mobile intelligent robot, for controlling image detection and processing, for route searching, and for robot movement.

BACKGROUND

In daily life, intelligent devices that may move, such as a cleaning robot, an intelligent balance wheel, an intelligent wheelchair, or the like, are becoming more and more common. The intelligent wheelchair may help the disabled to perform physiological functions, such as basic movement, observing the surroundings, or the like. The intelligent wheelchair typically utilizes an intelligent robot system to implement functions, such as moving, perceiving the surroundings, and monitoring health. In order to provide services within the region, the intelligent robot system may identify the surroundings and automatically move based on existing maps. With the rapid development of people's demand for services, people expect a multi-functional intelligent robot system that is able to update maps, plan routes and automatically move, especially an intelligent robot that may adapt to more complex regions.

SUMMARY

An aspect of the present disclosure relates to a system that includes a storage that stores instructions and a processor that communicates with the storage. When executing the instruction, the processor may establish communication with the movement module and the holder via a communication port. The processor may obtain information from the sensors of the movement module and the holder to build a map. The processor may also plan a route based on the information, and generate control parameters based on the information.

Another aspect of the present disclosure relates to a method that may include establishing communication with a movement module and a holder via a communication port. The method may include obtaining information from a sensor of the movement module and the holder to build a map; The method may further include planning a route based on the information and generating control parameters based on the information.

Another aspect of the present disclosure relates to a permanent computer readable medium embodied as a computer program product. The computer program product includes a communication port for establishing communication between a processor and a movement module, and between a processor and a holder. The communication port may establish communication by using an application program interface (API).

BRIEF DESCRIPTION OF THE DRAWINGS

The method, system and/or program are further described in the form of an embodiment. These exemplary embodiments are described with reference to the drawings. These embodiments are examples that do not limit the present disclosure, and the reference numerals in these embodiments represent numbers of the same structure in other views.

DETAILED DESCRIPTION

Figure 1:
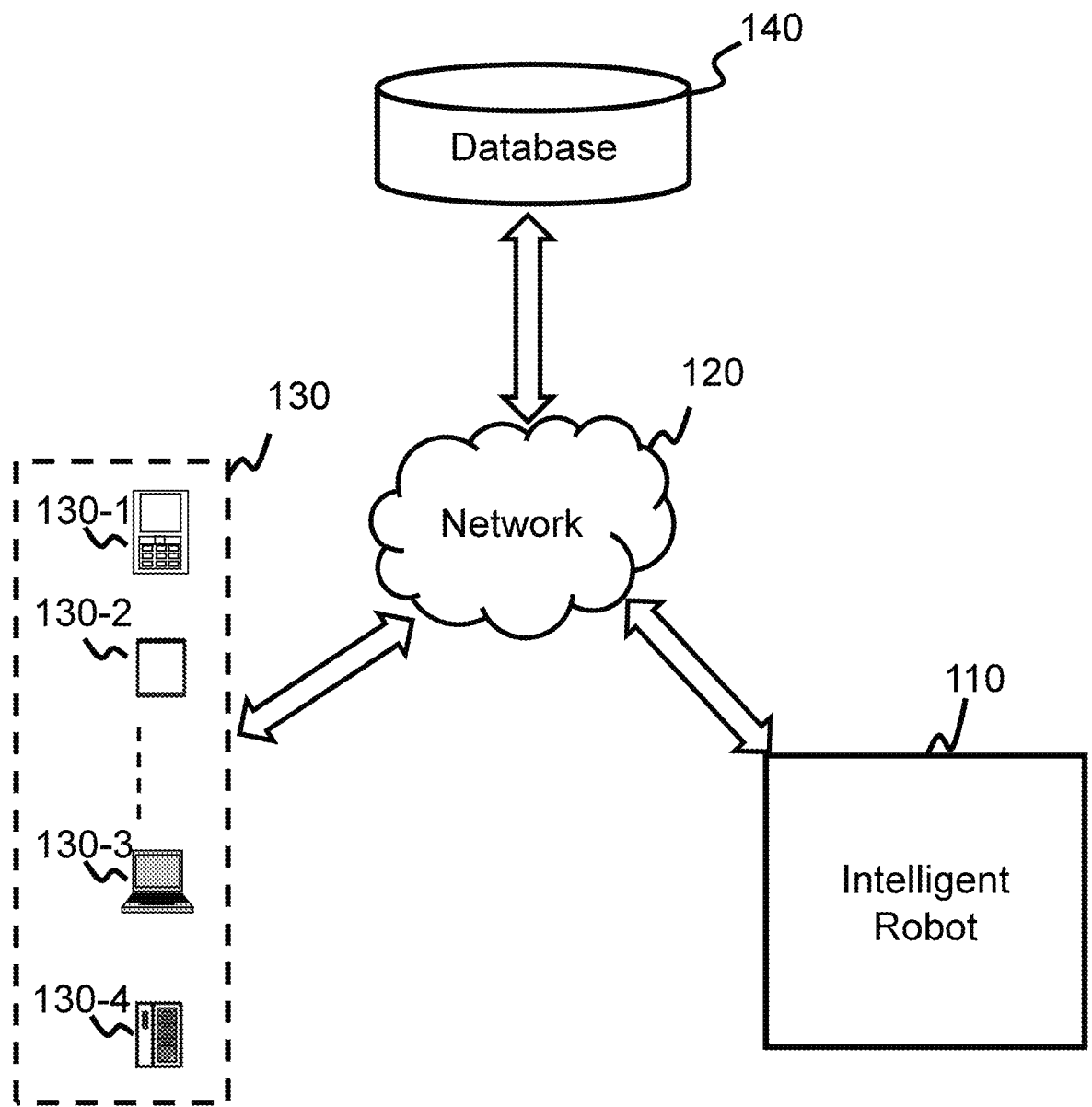
FIG. 1 is a schematic diagram illustrating a robot control system of a scanning system according to some embodiments of the present disclosure.

In the detailed description below, numerous specific details of the disclosure are set forth in order to provide a thorough understanding of the disclosure. However, it will be apparent, that the present disclosure may be practiced without these details for those ordinary technician in this field. In other cases, well-known methods, procedures, systems, components, and/or circuits in the present disclosure have been described at relatively high levels elsewhere, and are not described in detail in this disclosure to avoid unnecessarily repeating.

It should be understood that the terms "system," "device," "unit," and/or "module" are used in this disclosure as a method to distinguish a different component, component, portion, or part of the different levels of the order. However, if other expressions may achieve the same purpose, these terms may be replaced by other expressions.

It should be understood that when a device, a unit or a module is referred to as "on", "connected to" or "coupled to" another device, unit or module, it may be connected or coupled to or communicated with other devices, units or modules directly on another device, unit or module, or an intermediate device, unit or module may be present, unless the context clearly indicates an exceptional situation. For example, the term "and/or" as used in this disclosure includes any and all combinations of one or more of the associated listed items.

The term used in the disclosure is for the purpose of description rather than limiting the scope of the disclosure. As used in the disclosure and the appended claims, the singular forms "a," "an," and "the" include plural referents unless the content clearly dictates exceptional situation. In general, the terms "including" and "comprising" are merely meant to include the features, integers, steps, operations, elements and/or components that are specifically identified and such expression does not constitute an exclusive list, other features, integers, steps, operations, elements and/or components may also be included.

With reference to the following description and the drawings, these and other features and characteristic, operational methods, functions of related elements of the structure, combinations of parts, and economics of manufacture of the present disclosure may be better understood, and the description and drawings form part of the specification. However, it may be clearly understood that the drawings are for the purpose of illustration and descriptions only, and are not intended to limit the scope of the disclosure. It will be understood that the drawings are not to scale.

Moreover, the present disclosure only describes the systems and methods associated with determining the state of the intelligent robot, it may be understood that the description in this disclosure is only one embodiment. The system or method for the intelligent robot may also be applied to any type of intelligent device or vehicle other than an intelligent robot. For example, system or method for the intelligent robot may be applied to different intelligent device systems, including one of a balance wheel, an unmanned ground vehicle (UGV), an intelligent wheelchair, or the like, or any combination thereof. The intelligent robot system may also be applied to any intelligent system including applications management and/or distribution, such as systems for sending and/or receiving express delivery, as well as systems that carry people or goods to certain locations.

The terms "robot," "intelligent robot," "intelligent device" as used in this disclosure are used interchangeably to refer to an equipment, a device, or a tool that may be moved and operated automatically. The term "user device" in this disclosure may refer to a tool provided that may be used to request a service, order a service, or facilitate a service. The term "mobile terminal" in this disclosure may refer to a tool or an interface that may be used by a user to control an intelligent robot.

In this disclosure, the intelligent wheelchair system uses an intelligent robot to implement the function of moving, changing direction, stopping, perceiving the surroundings, drawing a map, and determining the driving route, or the like. It should be noted that the intelligent robot provided in this disclosure may also be used in other fields to implement similar functions or purposes.

The positioning techniques used in the present disclosure include one or any combination of global positioning system (GPS) technology, global navigation satellite system (GLONASS) technology, compass navigation system (COMPASS) technology, Galileo positioning system (Galileo) technology, quasi-zenith satellite system (QZSS) technology, wireless fidelity (WiFi) positioning technology, or the like. One or more of the positioning techniques may be used interchangeably in this disclosure.

The present disclosure describes a method for an intelligent robot control system 100 being as an exemplary system and a method for constructing a map and planning a route for the intelligent robot control system 100. The methods and systems of the present disclosure are intended to build a map based on, for example, the information obtained by the intelligent robot control system 100. The obtained information may be captured by sensors (groups) located in the intelligent robot control system 100. The sensor (group) may be optical or magnetoelectric. For example, the sensor may be a camera or a lidar.

FIG. 1 is a schematic diagram of a robot control system 100 according to some embodiments of the present disclosure. The intelligent robot control system 100 may include an intelligent robot 110, a network 120, a user device 130, and a database 140. The user may use the user device 130 to control the intelligent robot via the network 120.

The intelligent robot 110 may establish communication with the user equipment 130. The communication between the intelligent robot 110 and the user device 130 may be wired or wireless. For example, the intelligent robot 110 may establish communication with the user device 130 or database 140 via the network 120 and may wirelessly control the intelligent robot 110 based on operational commands (for example, moving or rotating commands) from the user device 130. As another example, the intelligent robot 110 may be directly connected to the user device 130 or the database 140 via a cable or fiber. In some embodiments, the intelligent robot 110 may update or download the map stored in the database 140 based on the communication between the intelligent robot 110 and the database 140. For example, an intelligent robot 110 may capture information in a route and may analyze the information to build a map. In some embodiments, the complete map may be stored in the database 140. In some embodiments, the map built by the intelligent robot 110 may include information corresponding to a portion of the complete map. In some embodiments, the corresponding part of the complete map may be updated by the built map. When the intelligent robot 110 determines its destination and current location, the complete map stored in the database 140 may be accessed by the intelligent robot 110. A portion of the complete map including the destination and current location of the intelligent robot 110 may be selected by the intelligent robot 110 for planning the route. In some embodiments, the intelligent robot 110 may plan the route based on the selected map, the destination and the current location of the intelligent robot 110. In some embodiments, the intelligent robot 110 may adopt a map of the user device 130. For example, a user device 130 may download a map from the Internet. The user device 130 may direct the movement of intelligent robot 110 based on a map downloaded from the Internet. As another example, the user device 130 may download the latest map from database 140. Once the destination and current location of the intelligent robot 110 is determined, the user device 130 may send the map obtained from the database 140 to the intelligent robot 110. In some embodiments, the user device 130 may be part of the intelligent robot 110. In some embodiments, if the map built by the intelligent robot 110 includes its destination and current location, the intelligent robot 110 may plan the route based on the map built by itself.

The network 120 may be a single network or a combination of different networks. For example, the network 120 may be a local area network (LAN), a wide area network (WAN), a public network, a private network, a wireless local area network (WLAN), a virtual network, a metropolitan area network (MAN), a public switched telephone network (PSTN), or any combination thereof. For example, the intelligent robot 110 may communicate with the user device 130 and the database 140 via Bluetooth. The network 120 may also include various network access points. For example, a wired or wireless access point, such as a base station or an internet switching point, may be included in the network 120. The user may send control operations from the user device 130 to the intelligent robot 110 and receive the results via the network 120. The intelligent robot 110 may access the information stored in the database 140 directly or via the network 120.

The user device 130 connectable to the network 120 may be one of the mobile device 130-1, the tablet computer 130-2, the laptop computer 130-3, the built-in device 130-4, or the like, or any combination thereof. In some embodiments, the mobile device 130-1 may include one of a wearable device, an intelligent mobile device, a virtual reality device, an augmented reality device, or the like, or any combination thereof. In some embodiments, the user may control the intelligent robot 110 via a wearable device, and the wearable device may include one of an intelligent bracelet, an intelligent footwear, an intelligent glasses, an intelligent helmet, an intelligent watch, an intelligent wear, an intelligent backpack, an intelligent accessory, or the like, or any combination thereof. In some embodiments, the intelligent mobile device may include one of an intelligent phone, a personal digital assistant (PDA), a gaming device, a navigation device, a point of sale (POS) device, or the like, or any combination thereof. In some embodiments, the virtual reality device and/or the augmented reality device may include one of a virtual reality helmet, a virtual reality glasses, a virtual reality patch, an augmented reality helmet, an augmented reality glass, an augmented reality eyewear, or the like, or any combination thereof. For example, the virtual reality device and/or augmented reality device may include Google Glass, Oculus Rift, HoloLens, Gear VR, or the like. In some embodiments, the built-in device 130-4 may include a laptop computer, a vehicle PC, a vehicle TV, or the like. In some embodiments, the user equipment 130 may be a device having a location technique for locating location of the user and/or user equipment 130 associated with the user. For example, the route may be determined by the intelligent robot 110 based on the map, the destination of the intelligent robot 110, and the current location. The location of the intelligent robot 110 may be obtained by the user device 130. In some embodiments, the user equipment 130 may be a device with image capture capabilities. For example, the map stored in the database 140 may be updated based on the information captured by an image sensor (for example, a camera). In some embodiments, the user device 130 may be a part of the intelligent robot 110. For example, an intelligent mobile with a camera, a gyroscope, and an accelerometer may be gripped by the holder of the intelligent robot 110. The user device 130 may be used as a sensor to detect information. As another example, the processor 210 and the storage 220 may be some parts of an intelligent mobile. In some embodiments, the user equipment 130 may also act as a communication interface for the user of the intelligent robot 110. For example, the user may touch the screen of the user device 130 to select the control operation of the intelligent robot 110.

The database 140 may store a complete map. In some embodiments, there may be a plurality of intelligent robots that are wirelessly connected to the database 140. Each intelligent robot connected to the database 140 may build a map based on the information captured by its sensors. In some embodiments, a map built by an intelligent robot may be part of a complete map. During the update process, the built map may replace the corresponding region in the complete map. Each intelligent robot may download a map from the database 140 when the route needs to be planned from the location of the intelligent robot 110 to the destination. In some embodiments, the map downloaded from the database 140 may be part of a complete map. The part of the complete map includes at least the location and destination of the intelligent robot 110. The database 140 may also store historical information related to users connected to the intelligent robot 110. The historical information may include, for example, information of a user's previous operations or information related to how the intelligent robot 110 operates. As shown in FIG. 1, the database 140 may be accessed by the intelligent robot 110 and the user device 130.

It should be noted that the intelligent robot control system 100 above is only intended to describe one example of a particular embodiment of the system, and is not intended to limit the scope of the disclosure.

Figure 2:
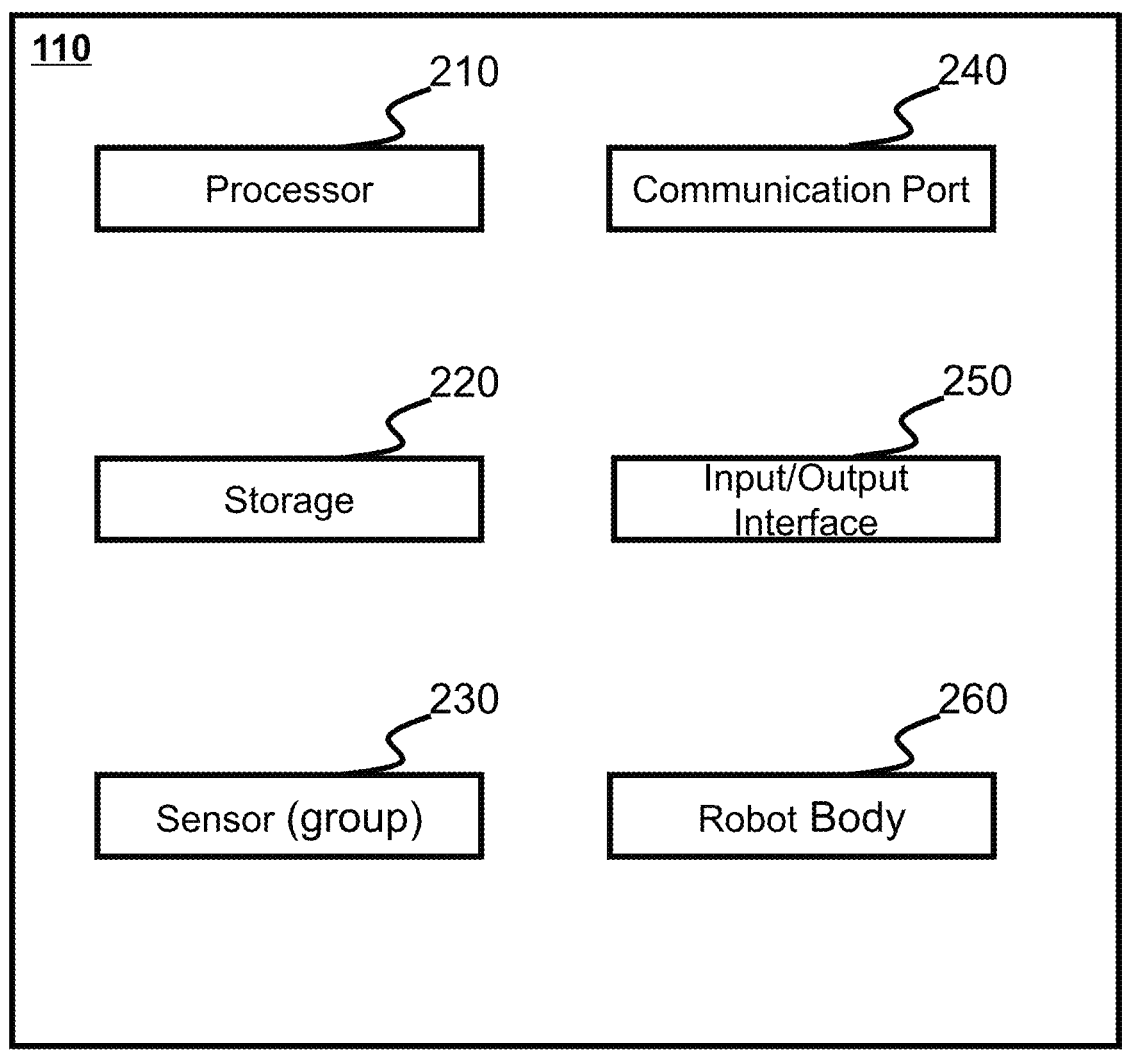
FIG. 2 is a schematic block diagram illustrating a robot in the robot control system in FIG. 1 according to an embodiment of the present disclosure.

According to some embodiments of the present disclosure, FIG. 2 is a block diagram of an exemplary intelligent robot 110 in the intelligent robot control system 100 shown in FIG. 1. The intelligent robot 110 may include a processor 210, a storage 220, a sensor (group) 230, a communication port 240, an input/output interface 250, and a robot body 260. The sensor (group) 230 may obtain information. In some embodiments, the information may include image data, gyroscope data, accelerometer data, position data, and distance data. The processor 210 may process the information to generate one or more results. In some embodiments, one or more results may include displacement information and depth information (e.g., a displacement of a camera between two adjacent frames, a depth of an object between two adjacent frames). In some embodiments, the processor 210 may build a map based on one or more results. The processor 210 may also transfer the map to the database 140 for update. In some embodiments, the processor 210 may receive a signal acquired by the sensor (group) 230. The signal may be one or more of a microwave signal, an image signal, an infrared signal, an audio signal, an ultrasonic signal, an acceleration signal, an angular velocity signal, or the like. The processor 210 may be a processing component or a device.

In some embodiments, the processor 210 may include one or more processors (e.g., a single core processor or a multi-core processor). For example only, the processor 210 may include one of a central processing unit (CPU), an application specific integrated circuit (ASIC), a dedicated instruction set processor (ASIP), a graphics processing unit (GPU), a physical processing unit (PPU), a digital signal processor (DSP), a field programmable gate array (FPGA), a programmable logic device (PLD), a controller, a microcontroller unit, a reduced instruction set computer, a microprocessor, or the like, or any combination thereof. As another example, the processor 210 may be a specially designed processing component or device with a special function.

The storage 220 may store instructions for the processor 210, and when executing the instructions, the processor 210 may perform one or more functions or operations described in this disclosure. For example, the storage 220 may store instructions executed by the processor 210 to process the information obtained by the sensor (group) 230. In some embodiments, the processor 220 may automatically store the information obtained by the sensor (group) 230. The storage 220 may also store one or more results generated by the processor 210 (e.g., displacement information and/or depth information for constructing a map). For example, the processor 210 may generate one or more results and store them in the storage 220, and one or more results may be read by the processor 210 from the storage 220 to build a map. In some embodiments, the storage 220 may store a map built by the processor 210. In some embodiments, the storage 220 may store a map obtained by the processor 210 from the database 140 or the user device 130. For example, the storage 220 may store a map built by the processor 210, and the built map may be sent to the database 140 to update the corresponding portion of the complete map. As another example, the storage 220 may temporarily store a map downloaded by the processor 210 from the database 140 or the user device 130. In some embodiments, the storage 220 may include one of a mass storage, a removable storage, a volatile read/write storage, a read only memory (ROM), or the like, or any combination thereof. Exemplary mass storage may include a magnetic disk, an optical disk, a solid-state drive, or the like. Exemplary removable storage may include a flash drive, a floppy disk, an optical disk, a memory card, a zip disk, a magnetic tape, or the like. An exemplary volatile read and write memory may include a random access memory (RAM). Exemplary RAMs may include a dynamic RAM (DRAM), a dual date rate synchronous dynamic RAM (DDR SDRAM), a static RAM (SRAM), a thyristor RAM (T-RAM), a zero capacitor RAM (Z-RAM), or the like. Exemplary ROM may include a mask ROM (MROM), a programmable ROM (PROM), an erasable programmable ROM (EPROM), an electrically erasable programmable ROM (EEPROM), a compact disk ROM (CD-ROM) digital multifunction disk ROM.

The sensor (set) 230 may include image data, gyroscope data, accelerometer data, position data, distance data, and any other data that may be used by the intelligent robot 110 to perform various functions described in this disclosure. For example, the sensor (group) 230 may include one or more night vision cameras for obtaining image data in low light environments. In some embodiments, the data and/or information obtained by the sensor (group) 230 may be stored in the storage 220 and be processed by the processor 210. In some embodiments, one or more sensors (groups) 230 may be installed in the robot body 260. More specifically, for example, one or more image sensors may be installed in the holder of the robot body 260. One or more navigation sensors, a gyroscope, and an accelerometer may be installed in the holder and movement module. In some embodiments, the sensor (group) 230 may automatically explore the surroundings and detect the location under the control of the processor 210. For example, the sensor (group) 230 may be used to dynamically sense or detect the location of objects, obstacles, or the like.

The communication port 240 may be a port for communicating within the intelligent robot 110. That is, the communication port 240 may exchange information between components of the intelligent robot 110. In some embodiments, the communication port 240 may send the signal/data/signal of the processor 210 to the internal portion of the intelligent robot 110 and receive signals from the internal portion of the intelligent robot 110. For example, the processor 210 may receive information from a sensor (group) installed in the robot body 260. As another example, the processor 210 may send control operations to the robot body 260 via the communication port 240. The sending-receiving process may be implemented via communication port 240. The communication port 240 may receive various wireless signals based on certain wireless communication specifications. In some embodiments, the communication port 240 may be provided as a communication module for known wireless local area communication such as Wi-Fi, Bluetooth, infrared (IR), ultra wideband (UWB), ZigBee, or the like, or as a mobile communication module such as 3G, 4G or Long Term Evolution (LTE), or as a known communication method for wired communication. In some embodiments, the communication port 240 is not limited to a component for sending/receiving signals from an internal device, and may be used as an interface for interactive communication. For example, the communication port 240 may establish communication between the processor 210 and other portions of the intelligent robot 110 using a circuitry of the application program interface (API). In some embodiments, the user device 130 may be part of the intelligent robot 110. In some embodiments, the communication between the processor 210 and the user equipment 130 may be performed by the communication port 240.

The input/output interface 250 may be an interface for communication between intelligent robot 110 and other external devices, such as database 140. In some embodiments, the input/output interface 250 may control data transmission with the intelligent robot 110. For example, the latest map may be sent from the database 140 to intelligent robot 110. As another example, a built map based on the information obtained by the sensor (group) 230 may be sent to the intelligent robot 110 from the database 140. The input/output interface 250 may also include various additional components such as a wireless communication module (not shown) for wireless communication or a tuner (not shown) for adjusting broadcast signals, that depends on the type of design of the intelligent robot 110 and the component to receive signal/data elements from external inputs. The input/output interface 250 may be used for a communication module of known wireless local area communication, such as Wi-Fi, Bluetooth, infrared (IR), ultra-wideband (UWB), ZigBee, or the like, or as a mobile communication module such as 3G, 4G or Long Term Evolution (LTE), or as a known input/output interface for a wired communication. In some embodiments, the input/output interface 250 may be provided as a communication module for known wired communication such as fiber optics or Universal Serial Bus (USB). For example, the intelligent robot 110 may exchange data with the computer's database 140 via a USB interface.

The robot body 260 may be a main body for holding the processor 210, the storage 220, the sensor 230, the communication port 240, and the input/output interface 250. The robot body 260 may execute instructions from the processor 210 to move and rotate the sensor (group) 230 to obtain or detect information of a region. In some embodiments, the robot body 260 may include a movement module and a holder, as described in other parts of the disclosure (such as FIG. 9 and its description) for the robot body 260. In some embodiments, sensors (groups) may be installed in the movement module and the holder respectively.

Figure 3:
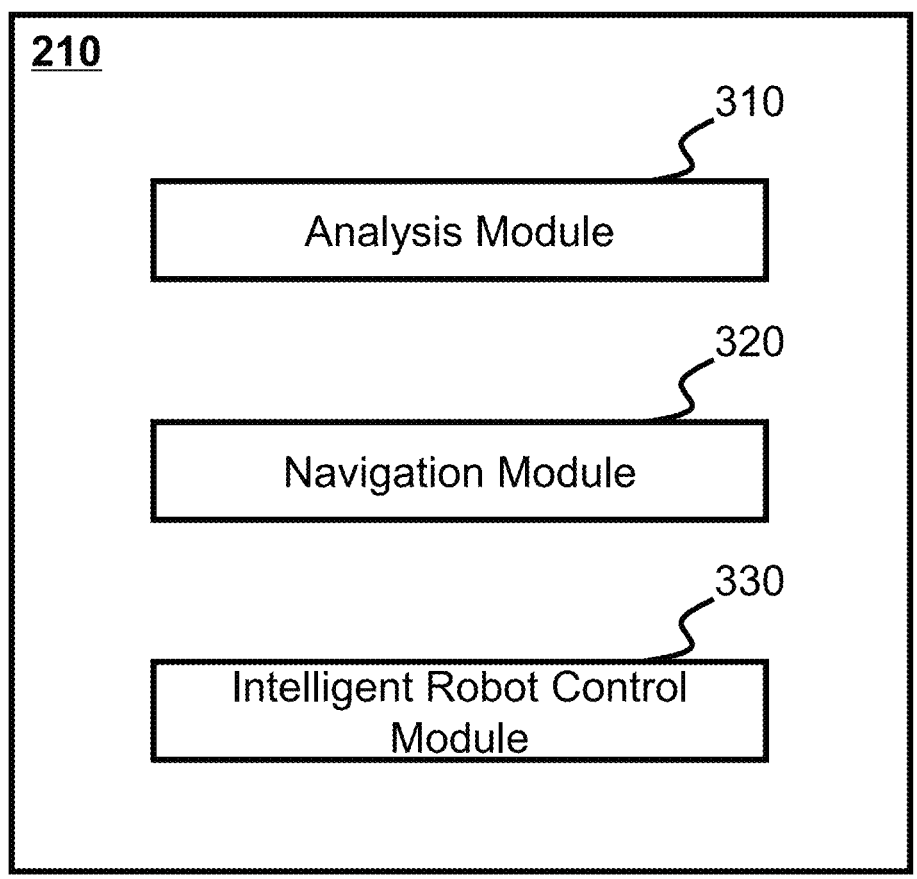
FIG. 3 is a schematic block diagram illustrating a processor in the robot in FIG. 2 according to some embodiments of the present disclosure.

According to some embodiments of the present disclosure, an exemplary structural diagram of a processor 210 shown in FIG. 3. As shown in FIG. 3, the processor 210 may include an analysis module 310, a navigation module 320, and an intelligent robot control module 330.

The analysis module 310 may analyze the information obtained from the sensor (group) 230 and generate one or more results. The analysis module 310 may build a map based on one or more results. In some embodiments, the built map may be sent to the database 140. In some embodiments, the analysis module 310 may receive the latest map from the database 140 and send it to the navigation module 320. The navigation module 320 may plan the route from the location of the intelligent robot 110 to the destination. In some embodiments, the complete map may be stored in the database 140. The map built by the analysis module 310 may correspond to a part of the complete map. The update process may replace the corresponding portion of the full map with the built map. In some embodiments, the map built by the analysis module 310 may be up-to-date, and include the location and destination of the intelligent robot 110. The analysis module 310 may not receive the map from the database 140. The map built by the analysis module 310 may be sent to the navigation module 320 to plan the route. The intelligent robot control module 330 may generate control parameters of the intelligent robot 110 based on the route planned by the navigation module 320. In some embodiments, the control parameters may be temporarily stored in the storage 220. In some embodiments, the control parameters may be sent to the intelligent robot body 260 to control the movement of the intelligent robot 110, see the description of the control parameters in other parts of the disclosure (such as FIG. 6, FIG. 7 and its description).

In some embodiments, the analysis module 310 may be used to analyze and process image signals received by the sensor. In some embodiments, the analysis module may analyze and process the image information acquired by the image sensor. The analysis module 310 may communicate with one or more image sensors and obtain an image signal acquired by the one or more image sensors. The image signal may be an image formed using visible light. The image signal may be an image formed by electromagnetic waves of other wavelength bands, for example, an infrared image formed by an infrared image sensor. An image sensor may be associated with one or more lenses. In some embodiments, there may also be a plurality of image sensors. A plurality of image sensors may be associated with a plurality of lenses. In some embodiments, the surrounding information may be obtained also by using an image sensor and a lens. In some embodiments, surrounding information including an object distance may be obtained by a plurality of image sensors and a plurality of lenses. In some embodiments, the image signal acquired by the analysis module may be a digital image.

Figure 4:
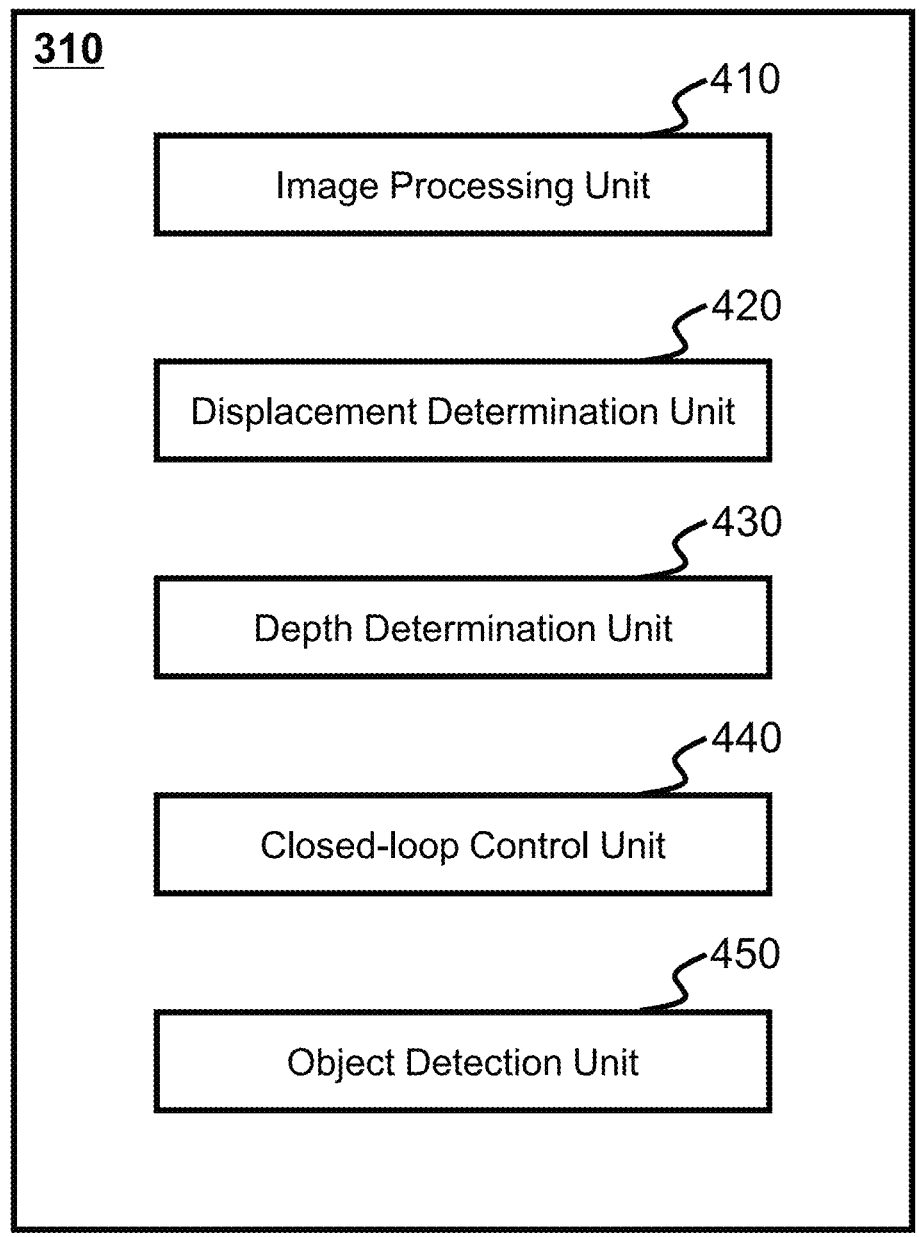
FIG. 4 is a schematic block diagram illustrating an analysis module in the processor in FIG. 3, according to some embodiments of the present disclosure.

According to some embodiments of the present disclosure, FIG. 4 is a schematic structural diagram of an exemplary analysis module 310 in the processor 210 shown in FIG. 3. In some embodiments, the analysis module 310 may include an image processing unit 410, a displacement determination unit 420, a depth determination unit 430, a closed-loop control unit 440, and an object detection unit 450.

The image processing unit 410 may process image data to perform one or more functions of the intelligent robot 110. The image data may include, for example, one or more images (such as still images, video frames, or the like.), initial depth and displacement of each pixel in each frame, and/or any other data associated with one or more images. In some embodiments, the displacement may include a displacement of the wheel between the time intervals in which two adjacent frames are taken and a displacement of the camera relative to the wheel. The image data may be provided by any device capable of providing image data, such as a sensor (group) 230 (for example, one or more image sensors). In some embodiments, the image data may include data about a plurality of images. An image may include a sequence of video frames (also referred to as "frames"). Each frame may be a frame, a field, or the like.

In some embodiments, the image processing unit 410 may process the image data to generate a movement information of the intelligent robot 110. For example, the image processing unit 410 may process two frames (for example, first frame and second frame) to determine the difference between the two frames. The image processing unit 410 may then generate the movement information of the intelligent robot 110 based on the difference between the frames. In some embodiments, the first frame and the second frame may be adjacent frames (for example, current frame and previous frame, current frame and subsequent frames, or the like.). In addition, the first frame and the second frame may also be non-adjacent frames. More specifically, for example, the image processing unit 410 may determine one or more corresponding pixels in the first frame and the second frame and one or more regions including corresponding pixels (also referred to as "overlapping regions"). In response to the determined first pixel and the second pixel of the same object, the image processing unit 410 may determine the first pixel in the first frame as the corresponding pixel of the second pixel in the second frame. The first pixel in the second frame and its corresponding pixel (for example, the second pixel) may be correspond to the same position of the opposite object. In some embodiments, the image processing unit 410 may identify one or more pixels in the first frame that do not have corresponding pixels in the second frame. The image processing unit 410 may further identify one or more regions (also referred to as "non-overlapping regions") including the identified pixels. The non-overlapping regions may correspond to the movement of the sensor (group) 230. In some embodiments, the pixels of the non-overlapping region in the first frame having no corresponding pixel in the second frame may be omitted in further processing (for example, by the processing of the displacement determination unit 420 and/or the depth determination unit 430).

In some embodiments, the image processing unit 410 may identify the intensity of the pixel in the first frame and the corresponding pixel in the second frame. In some embodiments, the intensities of the pixels in the first frame and the corresponding pixels in the second frame may be obtained as a criterion for determining the difference between the first frame and the second frame. For example, the RGB intensity may be selected as a criterion for determining the difference between the first frame and the second frame. The pixel, corresponding pixel, and RGB intensities may be sent to the displacement determination unit 420 and/or the depth determination unit 430 for determining the displacement and depth of the second frame. In some embodiments, the depth may represent the spatial depth of an object in two frames. In some embodiments, the displacement information may be a set of displacements of a set of frames. In some embodiments, depth information may be the depth of a set of frames. Frames, displacement information, and depth information may be used to build a map.

The displacement determination unit 420 may determine the displacement information based on the data provided by the image processing unit 410 and/or any other data. The displacement information may include one or more displacements of movement information that may represent a sensor (group) 230 that generates image data (for example, an image sensor that captures a plurality of frames). For example, the displacement determination unit 420 may obtain data for a corresponding pixel in two frames (for example, the first frame and the second frame). The data may include one or more values corresponding to the pixel, such as the gray value of the pixel, the intensity, or the like. The displacement determination unit 420 may determine the value of pixel based on any suitable color model (for example, RGB (red, green, and blue) models, HSV (hue, saturation, and brightness) models, etc.). In some embodiments, the displacement determination unit 420 may determine the difference between the corresponding pairs of pixels in the two frames. For example, the image processing unit 410 may identify the first pixel in the first frame and its corresponding pixel in the second frame (for example, the second pixel), and the second pixel may be determined based on the transformation of the coordinates of the first pixel. The first pixel and the second pixel may be correlated to the same object. The displacement determination unit 420 may also determine the difference between the value of the first pixel and the value of the second pixel. In some embodiments, the displacement may be determined by minimizing the sum of the differences between the corresponding pixel pairs in the first frame and the second frame.

In some embodiments, the displacement the determination unit 420 may determine an initial displacement $\xi_{ji,1}$ indicating an origin estimate of the displacement. For example, initial displacement $\xi_{ji,1}$ may be determined based on the following equation (1):

$$\xi_{ji,1} = \underset{\xi_{ji}}{\operatorname{argmin}} \int_\Omega |I_i(x) - I_j(\omega(x, D_i(x), \xi_{ji}))|_\delta dx \qquad (1)$$

Wherein, x represents the coordinates of the pixel in the first frame; $\omega(x,D_i(x)\xi_{ji})$ represents the coordinates of the corresponding pixel in the second frame. $\omega(x,D_i(\Box),\xi_{ji})$ and $I_i(x)$ may be at the same relative position of an object. And $\omega(x,D_i(x),\xi_{ji})$ is the transformation pixel of x after the camera moves a certain displacement $\xi_{ji}$. $\Omega$ is a set of pixel pairs, each of that includes a pixel in the first frame and a corresponding pixel drop in the second frame. $I_i(x)$ is the RGB intensity of the pixel that coordinate value is x; $I_j(\omega(x,D_i(x),\xi_{ji}))$ is the RGB intensity of that pixel is $\omega(x, D_i(x),\xi_{ji})$.

$\omega(x,D_i(x),\xi_{ji})$ is the transformation coordinate of x after the camera moves a certain displacement $\xi_{ji}$. In some embodiments, Displacement Determination Unit 420 may calculate the corresponding pixel $(x,D_i(x),\xi_{ji})$ based on the starting value $\xi_{ji}$ of the displacement and the initial depth $D_i(x)$. In some embodiments, initial depth $D_i(x)$ may be a zero matrix. The starting value of displacement $\xi_{ji}$ may be a variable. In order to obtain the initial displacement $\xi_{ji,1}$, the displacement determination unit 420 may require the starting value of the displacement $\xi_{ji}$ as shown in the iteration (1). In some embodiments, the starting value $\xi_{ji}$ of displacement may be determined based on the displacement of the wheel $\xi_{ji}'$ and the displacement of the camera relative to the wheel $\xi_{ji}'$. See the description of the starting value $\xi_{ji}$ elsewhere in this disclosure (for example, FIG. 17A and its description). In some embodiments, the starting value of the displacement may be the vector sum of $\xi_{ji}'$ and $\xi_{ji}''$. obtain The minimum difference value may be obtained between the two frames around the starting value of the displacement $\xi_{ji}$ starting value and variable.

In some embodiments, the Depth Determination unit 430 may determine the updated depth $D_{i,1}(x)$. Updated depth $D_{i,j}(x)$ may be calculated by equation (2):

$$D_{i,1}(x) = \underset{D_i(x)}{\operatorname{argmin}} \int_\Omega |I_i(x) - I_j(\omega(x, D_i(x), \xi_{ji,1}))|_\delta dx \qquad (2)$$

Wherein, the depth $D_i(x)$ represents the variable of the difference between the two frames in the equation (2). When the difference between the two frames is the minimum, the value $D_{i,1}(x)$ is determined as the updated depth. In some embodiments, initial depth $D_i(x)$ may be a zero matrix.

The displacement determination unit 420 may also generate updated displacement $\xi_{ji,1u}$ based on updated depth $D_{i,1}(x)$. In some embodiments, the updated displacement $\xi_{ji,1u}$ may be obtained based on equation (1) by replacing the initial depth $D_i(x)$ with the updated depth $D_{i,1}(x)$.

The closed-loop control unit 440 may perform closed loop detection. The closed-loop control unit 440 may detect whether the intelligent robot 110 returns to the previously accessed location and may update the displacement information based on the detection. In some embodiments, in response to determining that the intelligent robot 110 has returned to the previously visited location in the route, the closed-loop control unit 440 may use g2o closed loop detection to adjust the updated displacement of the frame to reduce errors. G2o closed-loop detection is a general optimization framework for reducing nonlinear errors. The updated displacement of the adjusted frame may be set for displacement information. In some embodiments, if the intelligent robot 110 includes a depth sensor such as a lidar, the depth may be directly obtained, the displacement may be determined based on the equation (1), and then the displacement may be adjusted by the closed-loop control unit 440 to generate an adjustment displacement.

First, when the depth sensor detects depth information, the displacement information may be a set of displacement based on equation (1), and then adjusted by the closed-loop control unit 440. When the depth information is a set of updated depth, the displacement information may be a set of displacements after being adjusted by the equation (1), the equation (2), and the closed-loop control unit 440.

In some embodiments, the closed-loop control unit 440 may generate a map based on the frame, the displacement information, and the depth information.

The analysis module 310 may also include an object detection unit 450 that may detect obstacles, objects, and distances from the intelligent robot 110 to obstacles and objects. In some embodiments, obstacles and objects may be detected based on data obtained by the sensor (set) 230. For example, the object detection unit 450 may detect an object based on distance data captured by a sonar, an infrared distance sensor, an optical flow sensor, or a lidar.

Figure 5:
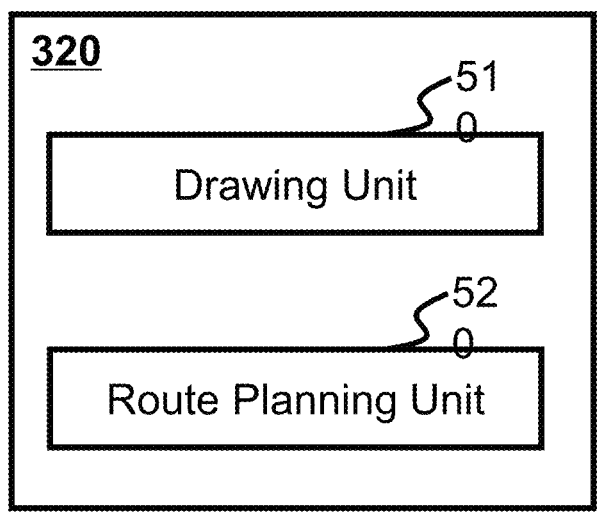
FIG. 5 is a schematic block diagram illustrating an exemplary navigation module in a processor according to some embodiments of the present disclosure.

FIG. 5 is a schematic structural block diagram illustrating an exemplary navigation module 320 in the processor 210 according to some embodiments of the present disclosure. In some embodiments, the navigation module 320 may include a drawing unit 510 and a route planning unit 520. In some embodiments, the drawing unit 510 may receive a map from the database 140. In some embodiments, the drawing unit 510 may process the map for route planning. In some embodiments, the map may be part of a complete map in database 140. For example, a map including the determined destination and intelligent robot 110 locations may be used to plan a route. In some embodiments, the map obtained from the database 140 may be a 3D map. In some embodiments, the drawing unit 510 may convert a 3D map into a 2D map by a projection technique. That is, the drawing unit 510 may divide the object in the 3D map into pixels and project the pixel onto the horizontal surface to generate a 2D map. Once the 2D map is obtained via the drawing unit 510, the route planning unit 520 may plan the route from the location of the intelligent robot 110 to the destination based on the transmitted 2D map.

The intelligent robot control module 330 may determine the control parameters based on the route planned by the route planning unit 520 in the navigation module 320. In some embodiments, the intelligent robot control module 330 may divide the route into a group of segments. The intelligent robot control module 330 may obtain a set of nodes of the segments. In some embodiments, the node between the two segments may be the end position of the previous segment and the start point of the latter segment. Control parameters may be determined based on the start and end positions.

In some embodiments, during the movement of the intelligent robot 110 in the segments, the end position of the intelligent robot 110 may not match the predetermined end position of the segment, and the route planning unit 520 may plan a new route based on the mismatched destination (the location of the new intelligent robot 110) and destination. In some embodiments, the intelligent robot control module 330 may segment the new route and generate one or more new segments, and then the intelligent robot control module 330 may determine a set of control parameters for each new segment.

Figure 6:
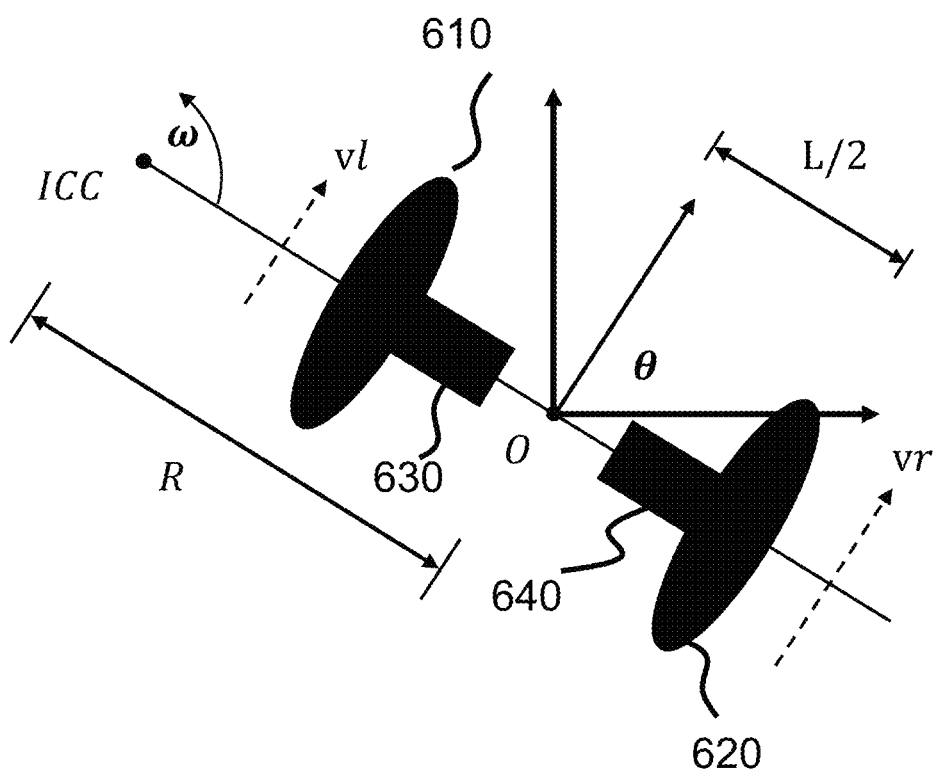
FIG. 6 is a schematic diagram illustrating an exemplary movement control according to some embodiments of the present disclosure.
Figure 7:
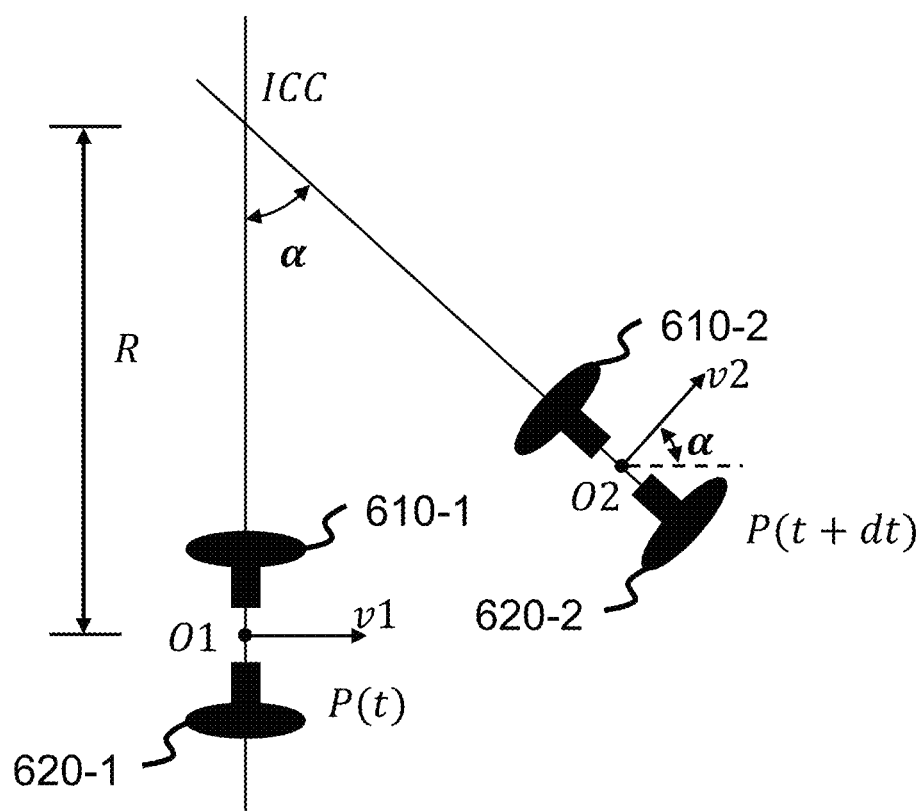
FIG. 7 is a schematic diagram illustrating an exemplary movement control according to some embodiments of the present disclosure.

FIGS. 6 and 7 are examples of movement control of the intelligent robot 110. As shown in FIG. 6, the movement module moves around the point ICC at an angular velocity $\omega$. The movement module includes two wheels, including a left wheel 610 that moves at speed $v_l$ and a right wheel 620 that moves at speed $v_r$. In some embodiments, the distance between the left wheel 610 and the right wheel 620 is L. The distance between the left wheel 610 and the center point O, and the distance between the right wheel 620 and the center point O is L/2. The distance between the center point O and the point ICC is R.

FIG. 7 is an exemplary schematic diagram of the control parameters of the intelligent robot 110 to determine the method. As shown in FIG. 7, the movement module of the intelligent robot 110 moves from the point $O_1$ to the point $O_2$ in dt. The angle between the line from Point $O_1$ to point ICC and the line from point $O_2$ to point ICC connection is $\alpha$. If dt, L, R, and $\alpha$ are known, the speed of the left wheel $v_l$ and the speed of the right wheel $v_\square$ may be calculated.

Intelligent wheelchair constantly senses the surrounding environment and its own state information during driving, The intelligent wheelchair is equipped with various sensors: an ultrasonic sensor, an infrared sensor, an image sensor, an accelerometer, a gyroscope, an optical flow sensor, a navigation sensor, a lidar, or the like. The choice of sensors is mainly based on the consideration of the surroundings used by the robot and the type of surrounding information acquired (such as two-dimensional information, three-dimensional information, distance information, image information, or the like). Via various sensors to collect different information data, it may be realized the monitoring of obstacles, distance, location, and other information.

Figure 8:
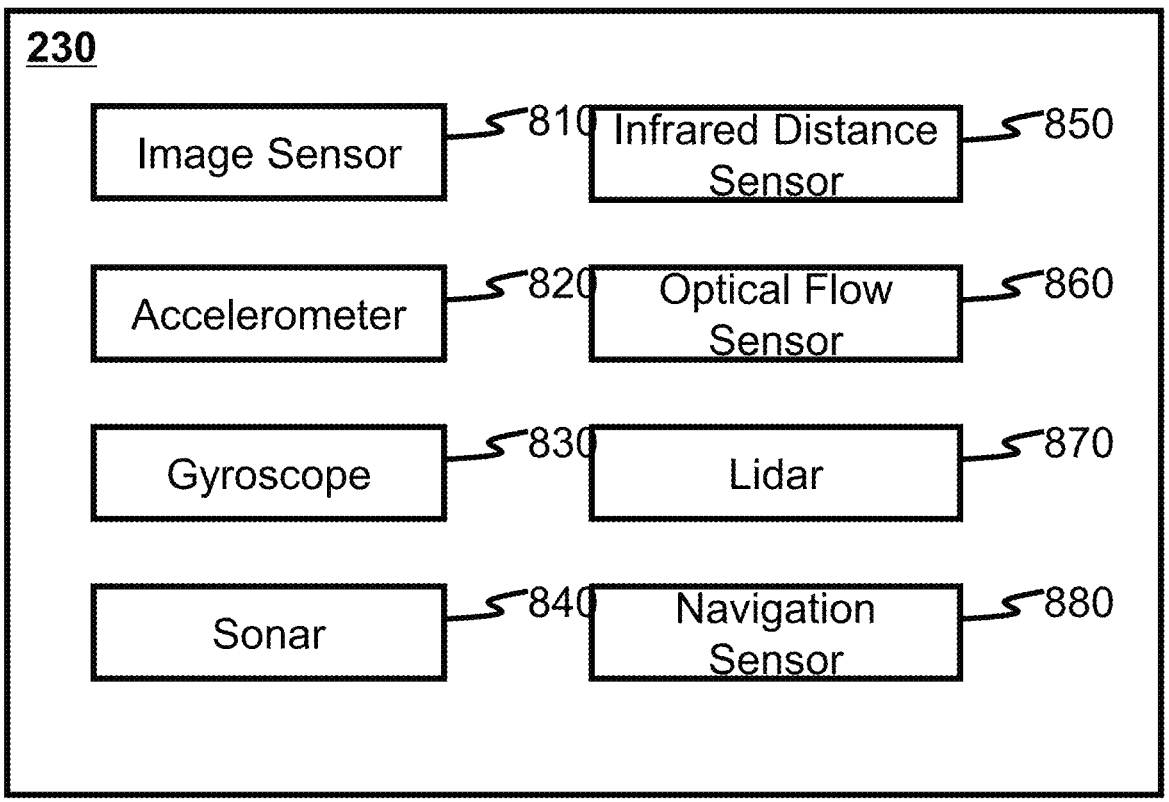
FIG. 8 is a schematic diagram illustrating an exemplary sensor structure in FIG. 2 according to an embodiment of the present disclosure.

According to an embodiment of the present disclosure, FIG. 8 is an exemplary structural block diagram of a sensor (group) 230. The sensor (group) 230 may include an image sensor 810, an accelerometer 820, a gyroscope 830, a sonar 840, an infrared distance sensor 850, an optical flow sensor 860, a lidar 870, and a navigation sensor 880.

The image sensor 810 may capture image data. The image sensor 810 may include a CCD camera, an infrared camera, a CMOS camera, an analog camera, a digital camera, or the like. In some embodiments, the analysis module 310 may build a map based on the image data. In some embodiments, the image data may include a frame, an initial depth and a displacement of each pixel on each frame. In some embodiments, the initial depth and displacement may be used to determine depth and displacement. The method for obtaining the depth and displacement may be found in the description of other parts of the present disclosure (details shown in equation (1) in FIG. 4). In some embodiments, the displacement may include a displacement of the wheel and a displacement of the camera relative to the wheel during a time interval between two adjacent frames.

In order to maintain a balance between a movement module and a holder, the accelerometer 820 and the gyroscope 830 may operate together. In order to obtain stability information from the sensor (group) 230, the balance is necessary. In some embodiments, in order to control the pitch attitude to a certain threshold, the accelerometer 820 and the gyroscope 830 may operate together. In some embodiments, the accelerometer 820 and the gyroscope 830 may both be held by the movement module and the holder, respectively. The description of the balance hold may be seen in the other sections of the present disclosure, such as FIG. 18, FIG. 19 and its description. The accelerometer may include a single-axis accelerometer, a two-axis accelerometer, a three-axis accelerometer, a piezoelectric accelerometer, a piezoresistive accelerometer, a potentiometer accelerometer, a vibrating accelerometer, a pendulum-integrated gyro accelerometer, or the like. The gyroscope may include a gyro direction meter, a gyro compass, a gyro vertical scale, a gyro stabilizer, a rate gyroscope, a gyro stabilization platform, a gyroscope sensor, a fiber gyroscope, a laser gyroscope, a MEMS gyroscope, or the like. In some embodiments, the gyroscope 830 is MEMS gyroscope.

The sonar 840, the infrared distance sensor 850, and the optical flow sensor 860 may be used to locate the intelligent robot 110. In some embodiments, the intelligent robot 110 may be located by the sonar 840, the infrared distance sensor 850, and the optical flow sensor 860 by detecting the distance between the intelligent robot 110 and an object or obstacle.

In some embodiments, the intelligent robot 110 may be positioned by one or any combination of a sonar 840, an infrared distance sensor 850, and an optical flow sensor 860. In some embodiments, other ultrasonic sensors may replace sonar. Infrared distance sensor 850 may include but is not limited to a heat detector and a photon detector.

The lidar 870 may detect the depth of an object in a frame. That is, the lidar 870 may obtain the depth of each frame, and the analysis module 310 in the processor 210 does not need to calculate the depth. The depth obtained by lidar 870 may be directly used to calculate the displacement described in function (1) in FIG. 4. The displacement obtained based on the function (1) may be adjusted by the closed-loop control unit 440. The lidar 870 includes but not limited to one-dimensional lidar, two-dimensional lidar, three-dimensional lidar, pulse lidar, continuous wave lidar, photon counting lidar, single-line lidar, multi-line lidar, area array lidar, or the like.

The navigation sensor 880 may apply positioning technology. The positioning technology may include a GPS positioning navigation system, a Beidou positioning navigation system, a Galileo positioning navigation system, or the like. The navigation sensor 880 may locate the intelligent robot within a rough region or range of locations. In some embodiments, the navigation sensor 880 may locate the intelligent robot 110 including any type of positioning system. The positioning system may include a Global Positioning System (GPS), a Beidou navigation or positioning system, and a Galileo positioning system.

It should be noted that in addition to the sensors mentioned, other types of sensors may be used, such as gas sensors, pressure sensors, displacement sensors, magnetic sensors, power sensors, temperature sensors, humidity sensors or ultraviolet sensors. Gas sensors may include, but not limited to, a carbon dioxide sensor, an oxidation pond sensor, an oxygen sensor, a sulfur dioxide sensor, a nitrogen oxide sensor, or the like. Pressure sensors may include, but not limited to, an absolute pressure sensor, a gauge pressure sensor, a vacuum pressure sensor, a differential pressure gauge, a sealed pressure sensor, or the like. The displacement sensor may include, but not limited to, a linear displacement sensor, an angular displacement sensor, or the like. The magnetic sensor may include, but not limited to, a Hall, an anisotropic magnetoresistance, a giant magnetoresistance, a measuring coil, a fluxgate, a fiber optic sensor, a superconducting quantum interferometer, or the like. The power sensor may include, but is not limited to, a DC power sensor, an AC power sensor, a variable frequency power sensor, or the like. Temperature sensor may include, but not limited to, a digital temperature sensor, a logic output temperature sensor, an analog temperature sensor, or the like. Humidity sensor may include, but not limited to, an infrared humidity sensor, a microwave humidity sensor, an ultrasonic humidity sensor, or the like. The ultraviolet sensor may include, but is not limited to, a visible light blind ultraviolet sensor, a solar blind ultraviolet sensor, or the like. These sensors may be used to observe and monitor the information in the surroundings to better perform the role of the intelligent wheelchair.

Figure 9:
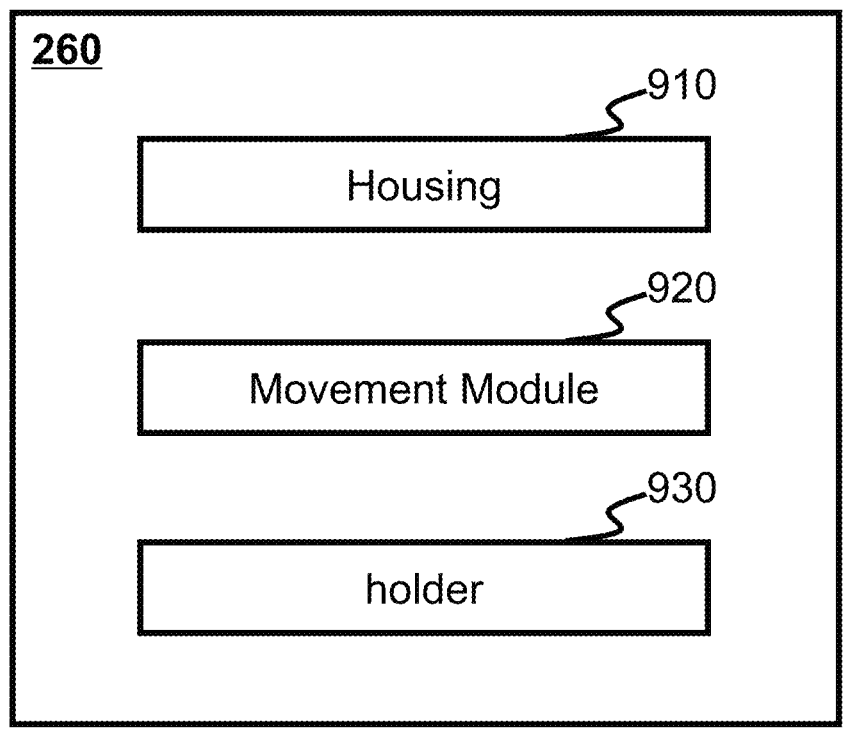
FIG. 9 is a schematic diagram illustrating an exemplary robot body in FIG. 2 according to an embodiment of the present disclosure.

According to some embodiments of the present disclosure, FIG. 9 is an exemplary block diagram of the robot body 260 described in FIG. 2. The robot body 260 may include a housing 910, a movement module 920, and a holder 930. The housing 910 may be a shell of the robot body 260 that protects the modules and units in the intelligent robot 110. The movement module 920 may be a movement operating component in the intelligent robot 110. In some embodiments, the movement module 920 may be moved based on control parameters generated by the intelligent robot control module 330 in the processor 210. For example, in a segment of the route determined by the intelligent robot control module 330, the determination of the control parameters may be based on the start and end positions of the segment of the route. The control parameters may then be transmitted from the intelligent robot control module 330 to the movement module 920 in order to move from the starting point to the end position for the intelligent robot 110. In some embodiments, the holder 930 may be at least one support device for the sensor described in FIG. 8. The holder 930 may support an image sensor 810, for example, a camera to capture frames. In some embodiments, the holder may support an image sensor 810, such as a camera, to capture frames. In some implementations, the holder 930 may support the accelerometer 820 and the gyroscope 830 to obtain stability information by maintaining the balance of the holder-supported sensors. In order to detect the distance between the intelligent robot 110 and an object or obstacle, the holder 930 may support at least one of the sonar 840, the infrared distance sensor 850, and the optical flow sensor 860. In some embodiments, in order to detect depth information or other information, the holder 930 may also support the lidar 870 and other sensors. In some embodiments, the navigation sensor 880 may be installed on the holder 930. In some embodiments, sensors supported by holder may be integrated on an intelligent mobile.

Figure 10:
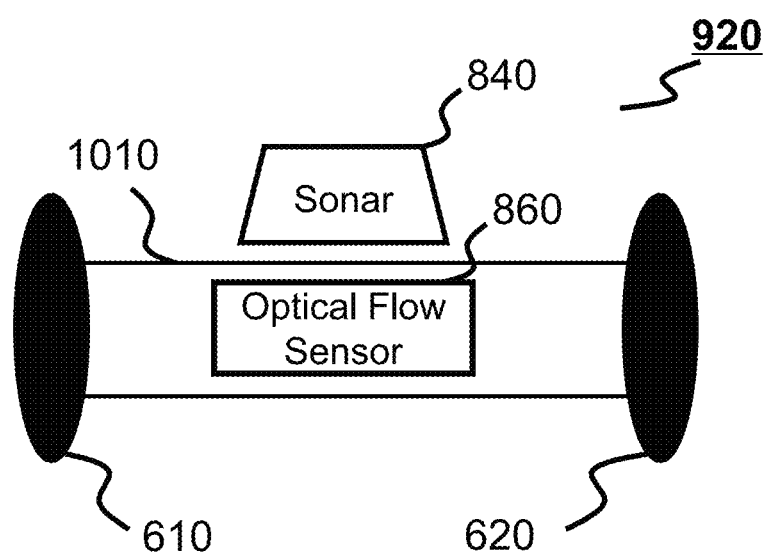
FIG. 10 is a schematic diagram illustrating an exemplary movement module according to an embodiment of the present disclosure.

FIG. 10 is an exemplary schematic diagram of a movement module 920. The movement module 920 may include a movement unit and a carrier 1010. The movement unit may include two wheels, that may include a left wheel 610 and a right wheel 620. The carrier 1010 may carry a sonar 840 or an optical flow sensor 860 to detect objects or obstacles. In some embodiments, a carrier 1010 may include an accelerometer 820 (not shown in FIG. 10) and a gyroscope 830 (not shown in FIG. 10) to maintain the balance of the movement module 920. In some embodiments, a carrier 1010 may include other sensors, such as an infrared distance sensor 850, to obtain other required information.

Figure 11:
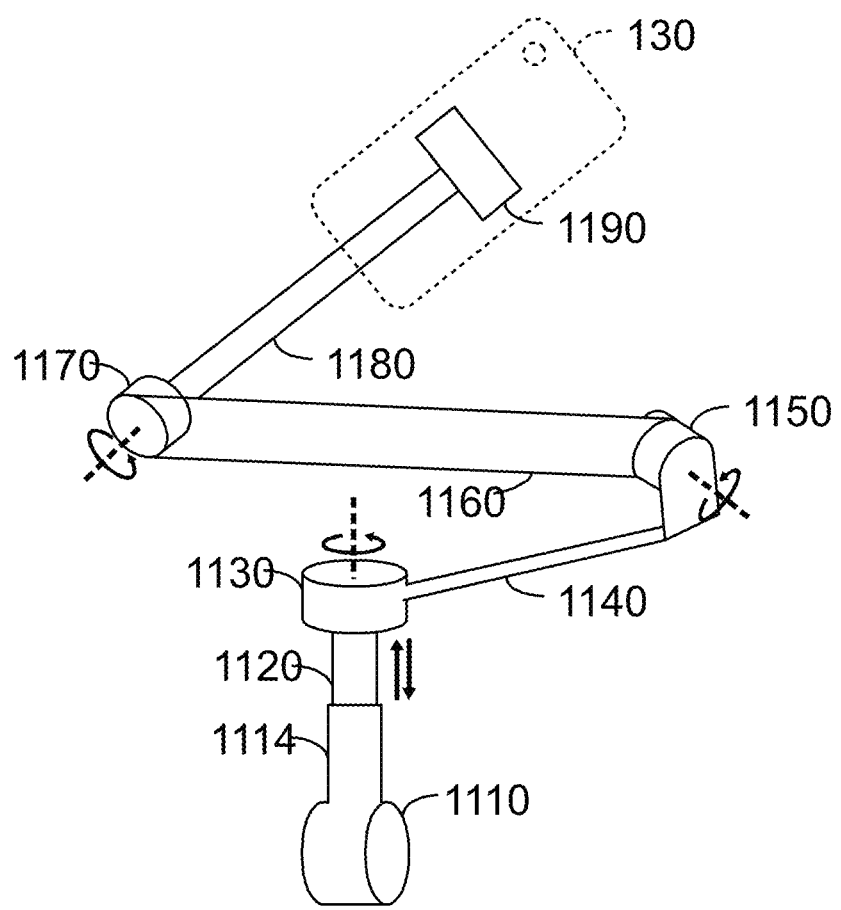
FIG. 11 is a schematic diagram illustrating an exemplary structure of a holder in FIG. 9 according to some embodiments of the present disclosure.

As shown in FIG. 9, the holder 930 may support the sensor (group) 230 to obtain information to generate a map, plan a route, or generate control parameters. According to some embodiments of the present disclosure, FIG. 11 is an exemplary schematic diagram of a holder 930 in the robot body 260 described in FIG. 11. In some embodiments, the holder 930 may include a rotating shaft 1170 for controlling the rotation around the X-axis, a rotating shaft 1150 for controlling the rotation around the Y-axis, and a rotating shaft 1130 for controlling the rotation around the Z-axis. The X axis may be the first axis in the horizontal plane, and the Y axis may be the second axis in the horizontal plane, the Z axis may be a vertical axis perpendicular to the horizontal plane. In some embodiments, the holder 930 may include a connecting rod 1180 for connecting the rotating shaft 1170 and the sensor, a connecting rod 1160 for connecting the rotating shaft 1150 and the rotating shaft 1170, and a connecting rod 1140 for connecting the rotating shaft 1130 and the rotating shaft 1150. In some embodiments, the holder 930 may include a connector 1110, a connecting rod 1114, and a dynamic Z-buffer bar 1120. In some embodiments, the sensor may be integrated into a user device 130 (for example, an intelligent mobile). A user device 130 may include sensors such as an image sensor 810, an accelerometer 820, a gyroscope 830, and a navigation sensor 880. The holder 930 may also include a connection block 1190 to support the user device 130. During the operation of the holder 930, sensors in the user device 130 acquire information. In some embodiments, the sensors in the user equipment 130 are controlled to obtain suitable information by adjusting the attitude of the holder 930. In some embodiments, the attitude of the holder 930 may be adjusted by rotating the rotating shaft 1170, the rotating shaft 1150 and the rotating shaft 1130 around the X axis, the Y axis and the Z axis.

Figure 20:
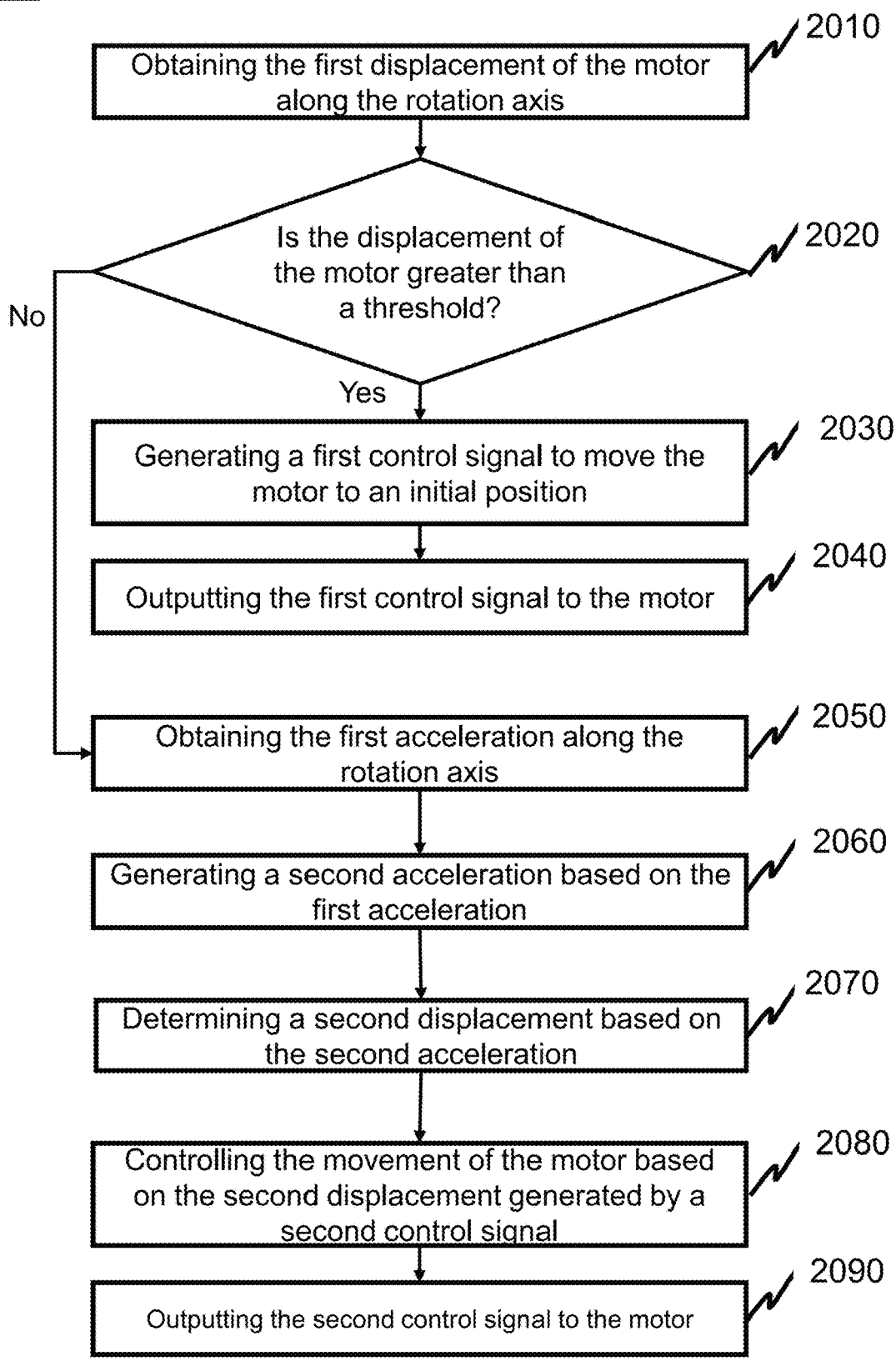
FIG. 20 is a flowchart illustrating an exemplary process for adjusting the vertical direction movement of the sensor in the intelligent device according to some embodiments of the present disclosure.

The traditional 3-axis holder may be used for aerial photography. In order to maintain the stability of the holder 930 during course movement, a dynamic Z-buffer connecting rod 1120 is useded in the holder 930. The dynamic Z-buffer connecting rod 1120 may maintain the stability of the holder 930 on the Z-axis. In some embodiments, the dynamic Z-buffer connecting rod 1120 may be a telescopic rod that may expand and contract along the Z-axis. The operating method of dynamic Z-buffer connecting rod 1120 in the holder 930 is illustrated in FIG. 20. According to the control parameters generated by the intelligent robot control module 330, the rotation and vertical movement of the rotating shafts 1130, 1150, 1170 of the dynamic Z-buffer connecting rod 1120 are controlled.

Figure 12:
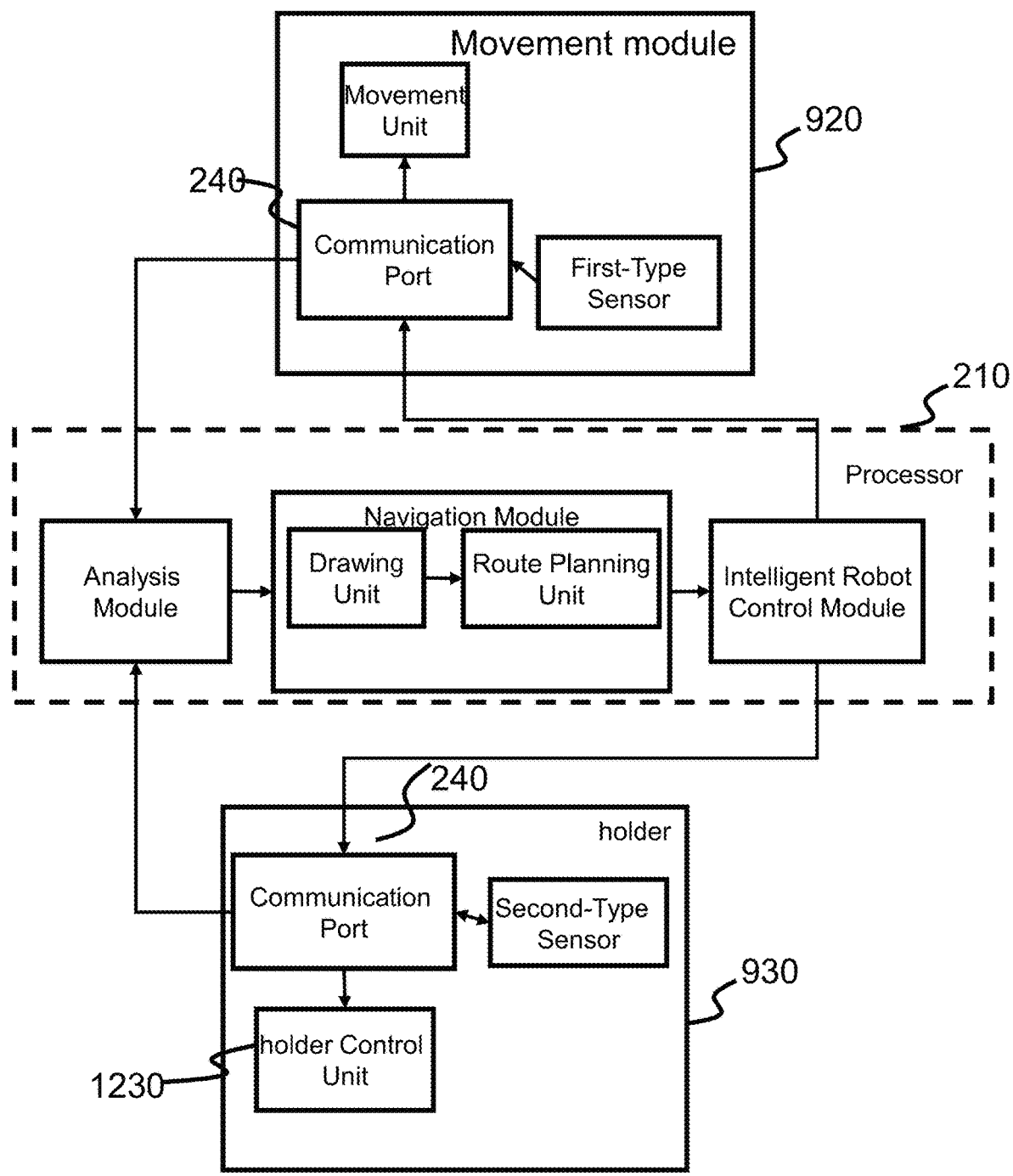
FIG. 12 is a robot system according to some embodiments of the present disclosure.

The intelligent robot 110 may have a plurality of modules and units. According to some embodiments of the present disclosure, FIG. 12 is a simple system of the intelligent robot 110. As shown in FIG. 12, the intelligent robot 110 may include a processor 210, a movement module 920, and a holder 930. In some embodiments, the processor 210 may include an analysis module 310, a navigation module 320, and an intelligent robot control module 330. The movement module 920 may include a movement unit 1210, a first-type sensor 1220, and a communication port 240. The holder 930 may include a holder control unit 1230, a communication port 240, and a second-type sensor 1240. In some embodiments, the processor 210 may send control parameters to control the movement unit 1210 in the movement module 920 and the holder control unit 1230 in the holder 930.

In some embodiments, the first-type sensor 1220 and the second-type sensor 1240 may obtain information. The first-type sensor 1220 may collect the surrounding information of the intelligent robot 110. The analysis module 310 may process the acquired information and build the map. In some embodiments, the built map may be sent to the database 140. In order to determine a route to the destination, a map is required for navigation, and the analysis module 310 may download an up-to-date map from the database 140 and send the latest map to the navigation module 320. The navigation module 320 may process the latest map and determine a route from the location of the intelligent robot to the destination. In some embodiments, the analysis 310 module may not download the complete map, the location of the intelligent robot and the complete map of the destination is enough for planning the route. In some embodiments, the map built by the analysis module 310 may include the location and destination of the intelligent robot 110, and the map is the latest map in the database. The map built by analysis module 310 may be sent to navigation module 320 to plan the route. The navigation module 320 may include a drawing unit 510 and a route planning unit 520. In some embodiments, based on the latest map or built map from the analysis module 310, the drawing unit 510 may generate a 2D map for route planning. The route planning unit 520 may plan a route that may be sent to the intelligent robot control module 330. The intelligent robot control module 330 may divide the route into one or more routes. The intelligent robot control module 330 may generate control parameters for each segment of the route. Each route has a start and end position, and the end of the route may be the starting point of the next route. In some embodiments, the end position of the intelligent robot 110 in a section of the route may not match the preset end position for the route, that may affect the planning of the remaining part of the route. Thus, it is necessary to re-plan the route based on the location of the mismatch (the new location of the intelligent robot 110) and the destination. In some embodiments, after a certain route, if a mismatch is detected, the re-planning process may be performed by the navigation module 320.

In some embodiments, if the first-type sensor 1220 in the movement module 920 and the second-type sensor 1240 in the holder 930 are unstable, the information captured by the first-type sensor 1220 in the movement module 920 and the second-type sensor 1240 in the holder 930 may not be suitable for building a map. In order to stabilize the first-type sensor 1220 and the second-type sensor 1240, the intelligent robot control module 330 may generate control parameters to stabilize the movement module 920 and the holder 930.

The sensor may be mounted on the movement module 920 and the holder 930. In some embodiments, the first-type sensor 1220 may include at least one of an accelerometer 820, a gyroscope 830, a sonar 840, an infrared distance sensor 850, an optical flow sensor 860, a lidar 870, and a navigation sensor 880. In some embodiments, the second-type sensor 1240 may include at least one of an image sensor 810, an accelerometer 820, a gyroscope 830, a sonar 840, an infrared distance sensor 850, an optical flow sensor 860, a lidar 870, and a navigation sensor 880. In some embodiments, the first-type sensor 1220 may include both the sonar 840 and the optical flow sensor 860. The sonar 840 and the optical flow sensor 860 may simultaneously determine obstacles and may be accurately positioned. In some embodiments, the second-type sensor 1240 may include an image sensor 810, an accelerometer 820, a gyroscope 830, and a navigation sensor 880. In some embodiments, the second-type sensor 1240 may exist in an external form. For example, an intelligent mobile may be connected to the holder 930. The intelligent mobile may include an image sensor 810, an accelerometer 820, a gyroscope 830, and a navigation sensor 880.

As shown in FIG. 12, the processor 210 may establish communication between the movement module and the holder 930 via the communication port 240. In some embodiments, the communication port 240 may be in any form. For example, the communication port 240 may be a wired or wireless transceiver. In some embodiments, the communication port 240 may exist in the form of an interface for interactive communication. For example, the communication port 240 may establish communication between processor 210 and other portions of intelligent robot 110 via circuitry that runs the application program interface (API). In some embodiments, API is a set of subroutine definitions, protocols, and tools for building software and applications. In some embodiments, the API may make the development of the program simpler by providing all the components, and then it may be assembled. In some embodiments, the API protocol may be used to design a circuit for wireless communication, for example, the wireless circuit may be Wi-Fi, Bluetooth, infrared (IR), ultra-wideband (UWB), and wireless personal area network (ZigBee), or the like, or may be a mobile communication module such as 3G, 4G, and Long Term Evolution (LTE). The API may separate the bottom hardware (such as movement module 920 or holder) and control hardware (such as processing module 210). In some embodiments, by invoking an API in a communication port 240, a processing module 210 (such as a portion of an intelligent mobile) may control the movement of the wheels in the movement module 920 and the attitude of an image sensor (for example, a camera) in the aholder 930. In some embodiments, the first-type sensor 1220 in the movement module 920 may send information (such as position data) to the intelligent mobile. In some embodiments, the second-type sensor 1240 in the holder 930 may send information (such as camera attitude) to the intelligent mobile.

Figure 13:
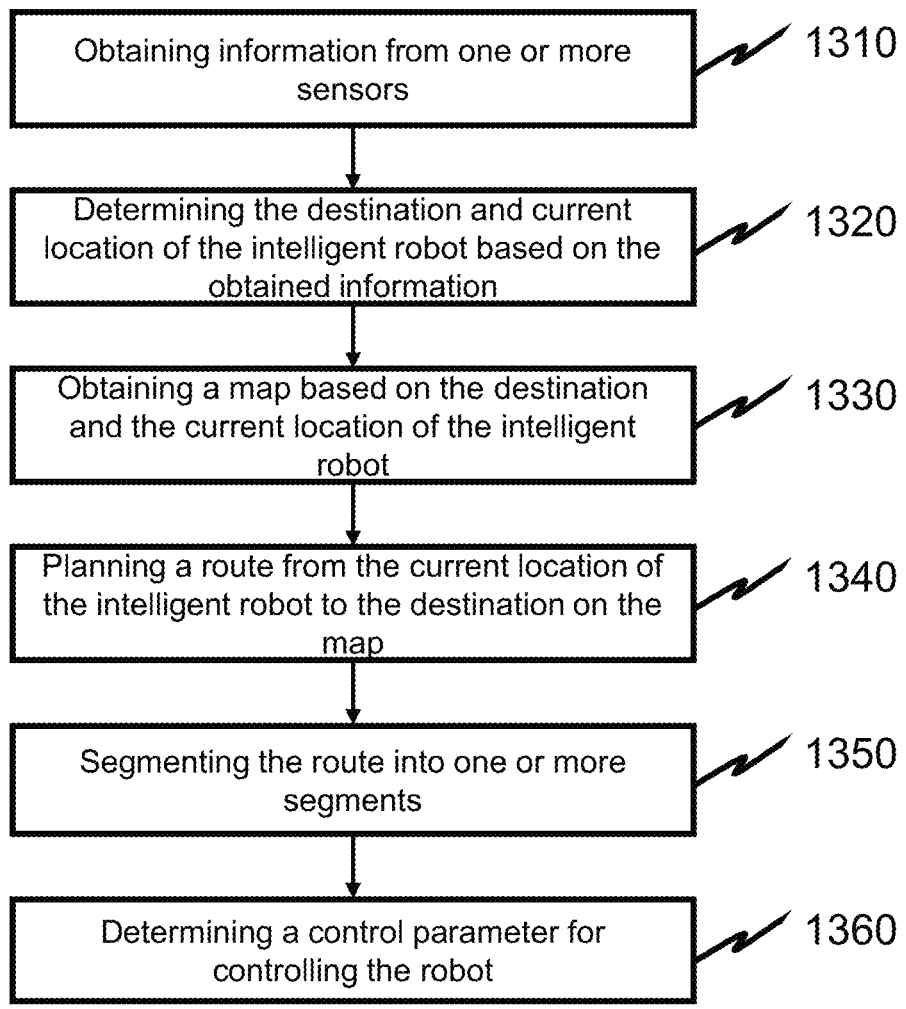
FIG. 13 is a flowchart illustrating an exemplary process for determining control parameters of the control robot according to some embodiments of the present disclosure.

According to some embodiments of the present disclosure, FIG. 13 is an exemplary flowchart for determining control parameters for controlling an intelligent robot. The operation 1300 described in FIG. 13 may be completed by the processor 210 in the intelligent robot 110 according to instructions stored in the storage 220.

In operation 1310, the processor 210 may obtain the information from the sensor (group) 230. As described in FIG. 3 and FIG. 12, the analysis module 310 in the processor 210 may receive the information from the movement module 920 and the holder 930 via the API port 240. In some embodiments, the movement of the intelligent robot 110 may be controlled via an analysis of the information. In another embodiment, the stability of the movement module 920 and the holder 930 in the intelligent robot 110 may be maintained by the analysis of the information.

In operation 1320, the processor 210 may determine the destination and current location of the intelligent robot 110 based on the obtained information. For example, the analysis module 310 in the processor 210 may receive position data from the sensor (group) 230. The sensor includes, but not limited to, a sonar, an infrared distance sensor, an optical flow sensor, a lidar, a navigation sensor, or the like. In some embodiments, the user may determine the destination via an input/output (I/O) interface 250. For example, a user may input a destination for the intelligent robot 110. The processor 210 may provide a moving route for the intelligent robot 110 using the user-defined destination information. In some embodiments, the processor 210 may determine the current location of the intelligent robot 110 based on the received information. In some embodiments, the processor 210 may determine the current location of the intelligent robot 110 based on the information obtained from the sensor (group) 230. For example, the processor 210 may determine a rough location of the intelligent robot based on the information obtained by the navigation sensor 880 in the positioning system (for example, GPS). For another example, the processor 210 may determine the precise location of the intelligent robot 110 according to the information acquired by at least one of the sonar 840, the infrared distance sensor 850, and the optical flow sensor 860.

In operation 1330, the processor 210 may obtain a map based on the destination and the current location of the intelligent robot 110, which may be used to plan the route. In some embodiments, a complete map including a large number of points representing the city may be stored in the database 140. By operation 1310 and operation 1320, after determining the destination and current location of the intelligent robot 110, a map including the destination and current location of the intelligent robot 110 is required to plan the route from the current location to the destination. In some embodiments, the map including the destination and current location of the intelligent robot 110 may be part of a complete map. In some embodiments, the analysis module 310 in the processor 210 may obtain a suitable portion of the complete map from the database 140 based on the destination and current location of the intelligent robot 110. In some embodiments, the analysis module 310 may build a map based on the information obtained from the sensor (group) 230, and the built map may be sent to the database 140 to update the entire map. In some embodiments, the built map may include the destination and current location of the intelligent robot 110. The navigation module 320 may use the built map to plan the route.

At operation 1340, based on the map obtained in operation 1330, the route from the current location of the intelligent robot 110 to the destination may be planned. The route plan may be completed by the navigation module 320. In some embodiments, the navigation module 320 may convert the resulting map into a two-dimensional map by the drawing unit 510. Then, the route planning unit 520 may obtain a route from the current location of the intelligent robot 110 to the destination based on the two-dimensional map.

In operation 1350, the intelligent robot control module 330 may segment the planned route into one or more segments. This route segmentation may, based on a threshold, be determined whether to perform, for example, if the planned route is less than a threshold, no route segmentation is required. In some embodiments, the route segmentation may be completed by the intelligent robot control module 330 according to the instructions in the storage module 220.

In operation 1360, the intelligent robot control module 330 may determine control parameters for controlling the robot based on the segments segmented in operation 1350. In some embodiments, operation 1350, each segment has a start point and an end position. In some embodiments, the intelligent robot control module 330 may determine the control parameters of the intelligent robot on the road segment based on the start and end positions of the same. Refer to the detailed descriptions in FIG. 6 and FIG. 7 for how to determine the control parameters between two points. In some embodiments, the control parameters need to be adjusted according to time. For example, when an intelligent robot 110 passes through two points on a straight line on a road segment, the intelligent robot 110 may adopt different movement speeds in different time periods from the first point to the second point. In some embodiments, the control parameters are used for the ensuring intelligent robot to remain stable during the movement along the planned route. For example, by maintaining the stability of the movement module 920 and the holder 930, the acquired sensing information may be made relatively more accurately. As another example, when the route is not flat, the control parameters may be used to stabilize the holder 930 in a direction perpendicular to the ground.

In some embodiments, the intelligent robot 110 may stop at a position that does not match the predetermined end position that the intelligent robot control module 330 sets according to the preset control parameter for the road segment which the intelligent robot 110 passes. The navigation module 320 may re-plan a new route based on the position where the match error is located and destination of the robot. The intelligent robot control module 330 may further divide the newly planned route into one or more segments, and the intelligent robot control module 330 may also determine the control parameters of the intelligent robot for the one or more segments. In some embodiments, the position mismatch may be estimated after the intelligent robot 110 passes each segment according to the comparison of the actual position of the intelligent robot and the preset end positions of the road segment.

Figure 14:
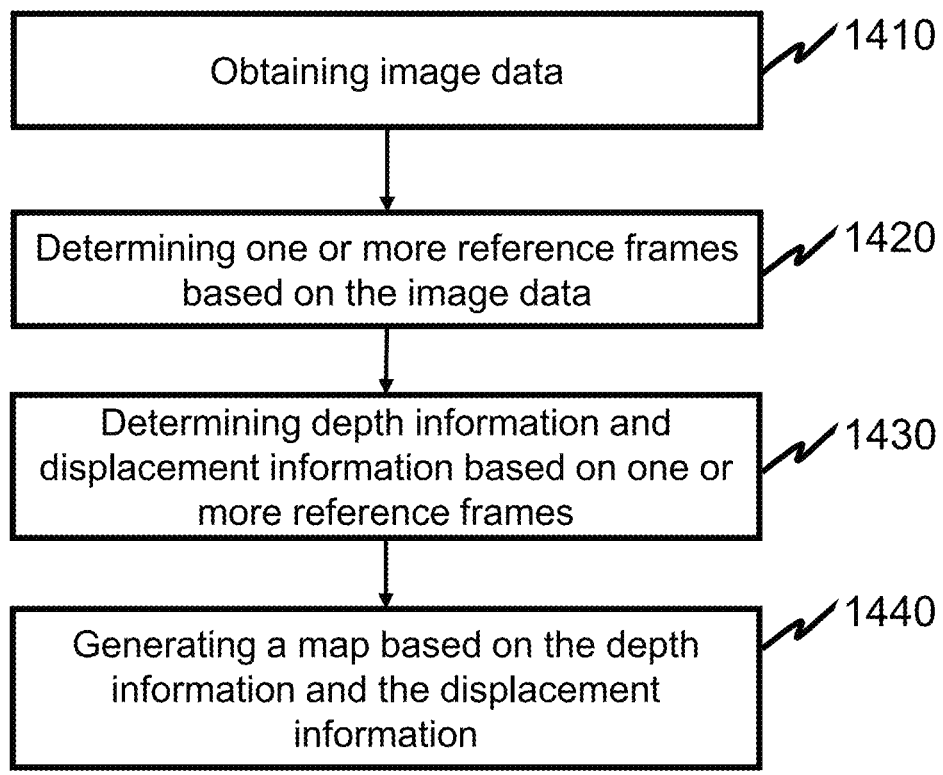
FIG. 14 is a flowchart illustrating an exemplary process for constructing a map according to some embodiments of the present disclosure.

According to some embodiments of the present disclosure, FIG. 14 is an exemplary flow diagram of the processor 210 generating a map. The operation of constructing the map shown may be done by the analysis module 310 based on the information obtained by the sensor (group) 230.

In operation 1410, the analysis module 310 may obtain image data from the image sensor 810. In some embodiments, the image data may include a large number of frames, an initial depth and/or a displacement of each pixel in the frame. The displacement may include a displacement of the wheel and a displacement of the camera relative to the wheel. In some embodiments, the initial depth may be set to a zero matrix. In some embodiments, if the sensor (group) 230 includes a lidar or a camera with a depth detection function, the depth information may be acquired by the sensor (group) 230.

In operation 1420, the analysis module 310 may determine one or more reference frames based on the image data. In some embodiments, the image data may include a large number of frames, an initial depth and/or a displacement of each pixel in the frame. In some embodiments, the analysis module 310 may select one or more reference frames from these frames. Please refer to other parts of the present disclosure for a detailed description, for example, FIG. 15 and its corresponding specification section. In some embodiments, reference frame may be used to build a map.

In operation 1430, the analysis module 310 may determine depth information and displacement information based on one or more reference frames. That is, in order to obtain the displacement information and depth information of each frame, the image data may be processed by the analysis module 310. For information on how to determine displacement information and depth information, please refer to the other sections of the current disclosure, for example, FIG. 4 and its specification.

In operation 1440, the analysis module 310 may generate a map based on the one or more reference frames and depth information and displacement information of the frame. In some embodiments, a three-dimensional map may be obtained by connecting one or more reference frames to the corresponding displacement.

The map may be determined by a large number of frames and their corresponding displacement information and depth information. In some embodiments, the order of the operation 1420 and the operation 1430 may be reversed or synchronized. For example, the operation 1420 may also include the process of determining displacement information and depth information in operation 1430 during the determination of one or more reference frames. That is, the operation 1430 may be a sub-operation of the process of the operation 1420 determining one or more reference frames. As described in the description of FIG. 4, image data may be processed to obtain one or more results. In some embodiments, the one or more results may include displacement information (for example, camera displacement between adjacent two frames) and depth information (for example, depth of one of two adjacent frames). In some embodiments, the one or more results may be adjusted by the g2o closed loop detection technique to generate adjusted displacement information. In some embodiments, the adjusted displacement information may be used as displacement information to generate a map. The analysis module 310 may generate a map based on one or more reference frames and their corresponding displacement information and depth information.

Figure 15:
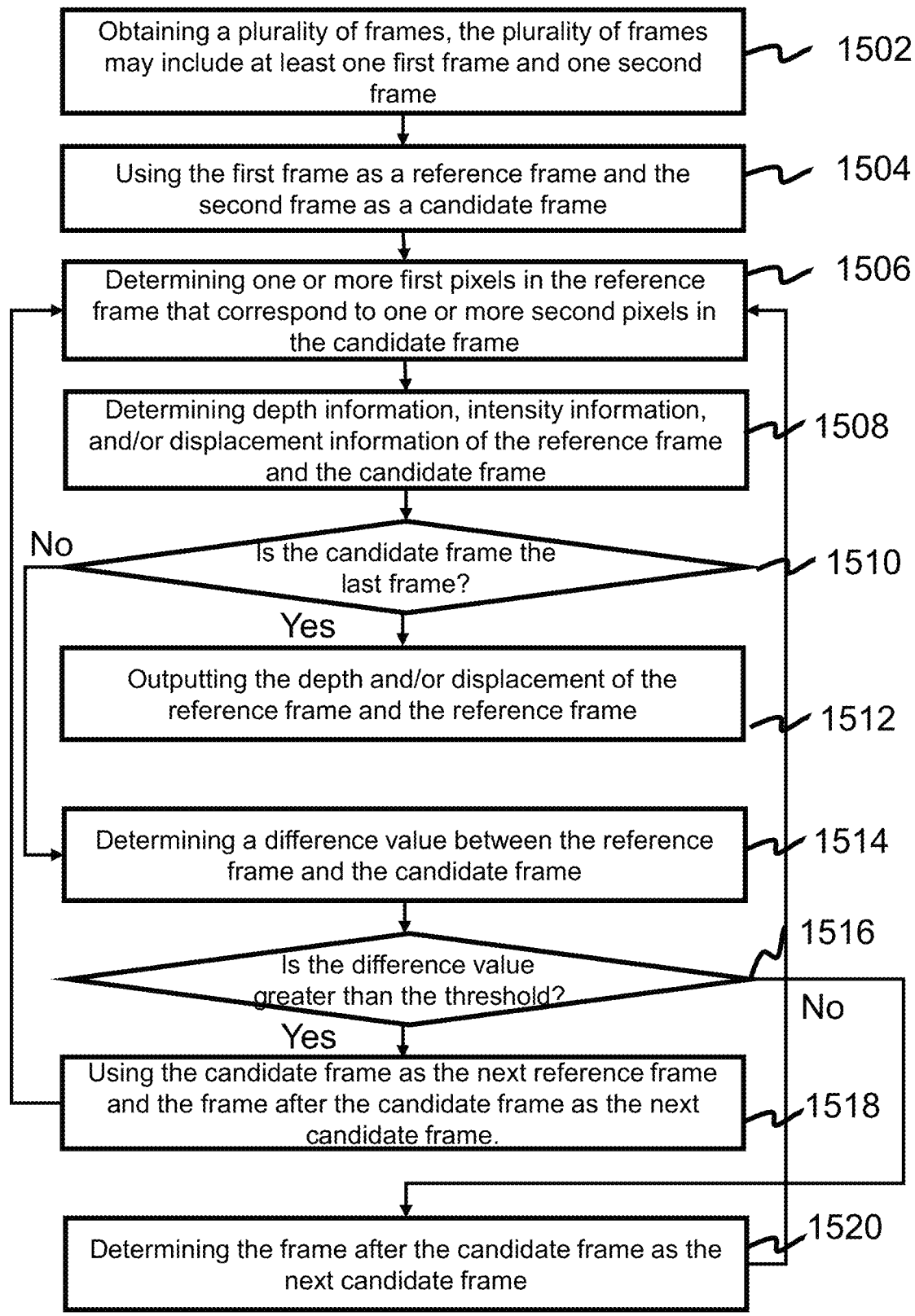
FIG. 15 is a flowchart illustrating an exemplary process for determining one or more reference frames according to some embodiments of the present disclosure.

According to some embodiments of the present disclosure, FIG. 15 is an exemplary flowchart for determining one or more reference frames. This operation may be completed by the analysis module 310, the displacement decision unit 420, and the depth decision unit 430 according to the image data acquired by the image sensor 810. Specifically, the analysis module 310 may determine one or more reference frame according to one or more results (for example, displacement information and depth information).

In operation 1502, the analysis module 310 may obtain image data including a plurality of frames that may include at least one first frame and one second frame. In some embodiments, the first frame may be an existing frame, and the second frame may be a subsequent frame of the first frame. That is, the image sensor 810 may grab the first frame at a time point and grab the second frame at the next time point. That is, the plurality of frames may be adjacent to each other in the time domain.

In operation 1504, the analysis module 310 may use the first frame as a reference frame and the second frame as a candidate frame.

In operation 1506, the analysis module 310 may determine one or more first pixels in the reference frame that correspond to one or more second pixels in the candidate frame. In some embodiments, the reference frame and the candidate frame have overlapping regions, in this time, the first pixel and the second pixel may refer to the same position of an object in the overlapping region of the reference frame and the candidate frame. In some embodiments, one or more first pixels may be a set of pixels Ω described in FIG. 4. In some embodiments, the reference frame and the candidate frame do not overlap the region, that is, any region in the reference frame does not correspond to any region in the candidate frame. At this time, the pixels in the reference frame and the candidate frame may not be selected as the first pixel and/or the second pixel.

In operation 1508, the analysis module 310 may determine depth information, intensity information, and/or displacement information of the reference frame and the candidate frame. In some embodiments, the method for determining depth information, intensity information, and/or displacement information may be described in FIG. 4.

In operation 1510, the analysis module 310 may determine if the candidate frame is the last frame. Specifically, the analysis module 310 may detect whether the next frame of the candidate frame exists in the time domain, and if the next frame of the candidate frame exists, the process proceeds to the operation 1512; Otherwise, the process proceeds to operation 1514.

In operation 1512, if the next frame of the candidate frame is determined to be the last frame, the analysis module 310 may output the depth and/or displacement corresponding to the reference frame and the reference frame.

In operation 1514, the analysis module 310 may determine a difference value between the reference frame and the candidate frame. In some embodiments, the difference value between the reference frame and the candidate frame may be determined according to the intensity information of the reference frame and the candidate frame. In some embodiments, the strength of the reference frame may be determined by the RGB intensity of the first pixel or the first pixel, and the intensity of the candidate frame may be determined by the RGB intensity of the one or more second pixels. In some embodiments, the intensity information of the reference frame and the candidate frame may be determined by operation 1504. In some embodiments, the intensity information of the reference frame and the candidate frame may be determined by the operation 1514 before determining the difference value between the reference frame and the candidate frame.

In operation 1516, the analysis module 310 may determine if the difference value between the reference frame and the candidate frame is greater than a threshold. If the difference between the reference frame and the candidate frame is greater than the threshold, the process proceeds to the operation 1518; otherwise, the process proceeds to the operation 1520.

In operation 1518, if the difference value between the reference frame and the candidate frame is determined to be greater than the threshold, the analysis module 310 may use the candidate frame as the updated reference frame, and the frame after the candidate frame as the updated candidate frame. In some embodiments, the frame after the candidate frame may be a frame that is closely adjacent to the candidate frame. At this point, the updated reference frame and the updated candidate frame are sent to the operation 1506, repeating the process 1500.

In operation 1520, if the difference value between the reference frame and the candidate frame is determined to be no greater than the threshold, the analysis module 310 may determine the frame after the candidate frame as the updated candidate frame. At this point, the updated reference frame and the updated candidate frame will be sent to the operation 1506, repeating the process 1500.

In some embodiments, the operation 1518 or the operation 1520 may output a new reference frame and a new candidate frame to be processed by the analysis module 310. In some embodiments, when the difference value between the reference frame and the candidate frame is greater than a threshold, a new reference frame may be obtained by replacing the reference frame with a candidate frame. In some embodiments, a new candidate frame may be obtained by replacing the candidate frame with the next frame of the candidate frame. That is, the substitution of the candidate frame may be unconditional, and the substitution of the reference frame is conditional.

When the operation 1512 obtains the map, the process 1500 terminates. In some embodiments, in order to terminate the process 1500 in time, a condition for determining the termination may be specified. For example, a counter may be used in the process 1500 such that the number of cycles of the process 1500 is not greater than a predetermined threshold.

Figure 16:
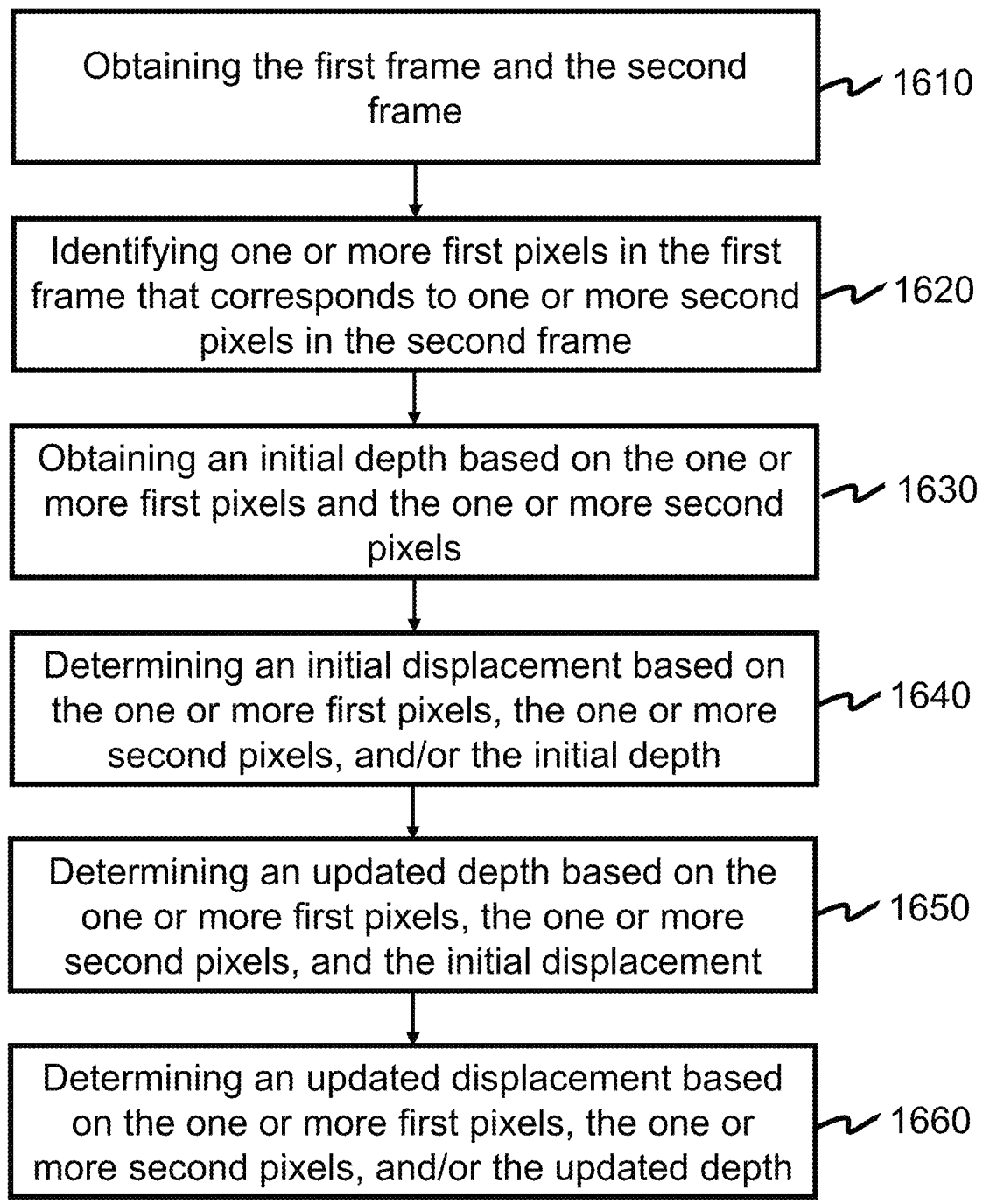
FIG. 16 is a flowchart illustrating an exemplary process for obtaining depth information, intensity information, and displacement information according to some embodiments of the present disclosure.

According to some embodiments of the present disclosure, FIG. 16 is an exemplary flowchart for obtaining depth information and displacement information of a reference frame and/or a candidate frame. In some embodiments, the process may be completed by the analysis module 310. In some embodiments, the process is similar to the method of acquiring the displacement and depth of a frame as described in FIG. 4.

In operation 1610, the analysis module 310 may obtain a first frame and a second frame from a large number of frames obtained from the image sensor 810. In some embodiments, the analysis module 310 may select the first frame and the second frame from among a large number of frames captured by the image sensor. In some embodiments, the first frame and the second frame may be adjacent to each other in the time domain, the first frame may be an existing frame, and the second frame may be a subsequent frame.

In operation 1620, the analysis module 310 may identify one or more first pixels in the first frame that corresponds to one or more second pixels in the second frame. The pixel in the first frame may be identified using the operation 1506 as described in FIG. 15 with respect to the pixel in the second frame.

In operation 1630, the analysis module 310 may obtain an initial depth based on the one or more first pixels and the one or more second pixels. In some embodiments, the initial depth may be set to a zero matrix. In operation 1640, the analysis module 310 may determine an initial displacement based on the one or more first pixels, the one or more second pixels, and/or the initial depth. For example, the operation 1640 may be implemented by the function (1) described in FIG. 4.

In operation 1650, the analysis module 310 may determine an updated depth according to the one or more first pixels, the one or more second pixels, and the initial displacement. In some embodiments, the operation 1650 may be implemented by the function (2) described in FIG. 4.

In operation 1660, the analysis module 310 may determine an updated displacement based on the one or more first pixels, the one or more second pixels, and/or the updated depth. In some embodiments, the operation 1660 may be implemented by the function (1) described in FIG. 4, that is, the updated depth is replaced by initial depth.

Figure 17A:
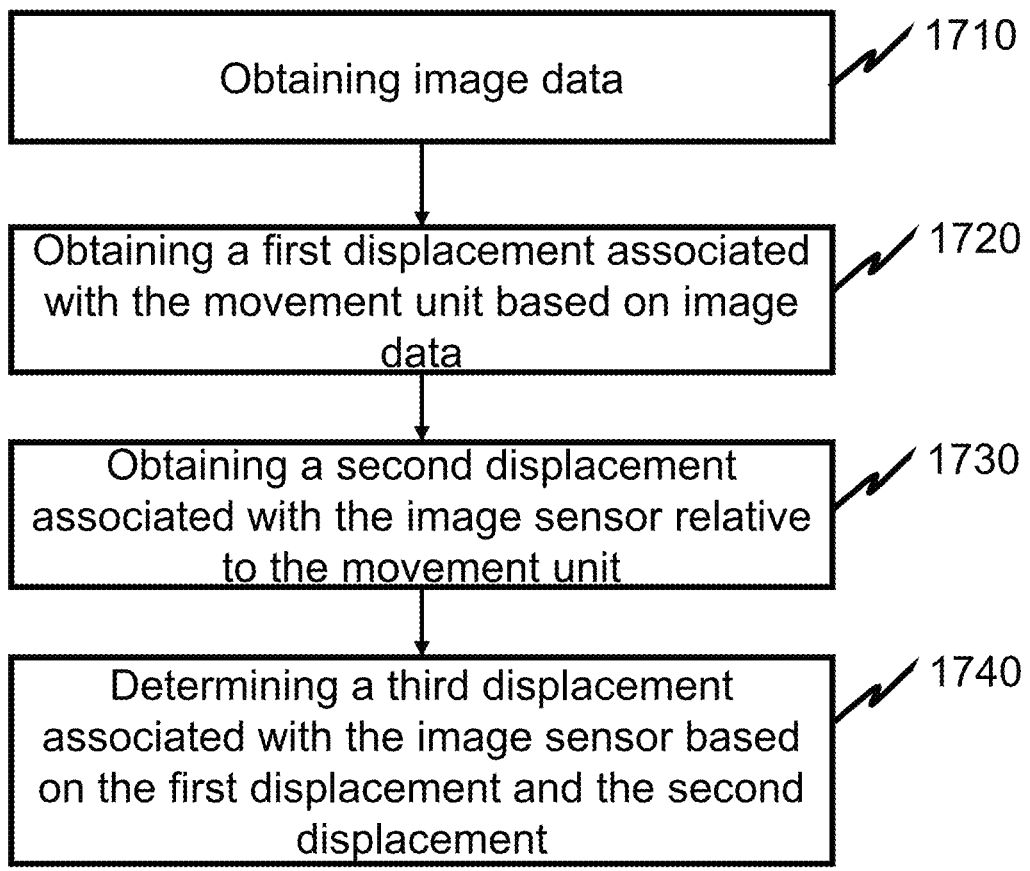
FIG. 17A is a flowchart illustrating an exemplary process for determining a displacement starting value according to some embodiments of the present disclosure.

As described in FIG. 4, in order to determine the displacement by the function (1), an initial displacement may be obtained first. As shown in function (1), it is determined that the initial displacement needs to provide the starting value of the displacement. According to some embodiments of the present disclosure, FIG. 17A is an exemplary flowchart for determining a displacement starting value. This process may be completed by the analysis module 310 based on the image data obtained by the image sensor 810.

At operation 1710, image data may be obtained from analysis module 310. In some embodiments, the starting value of the displacement may be determined according to the image data. Specifically, the starting value of the displacement may be determined according to the displacement in the image data. In some embodiments, the displacement in the image data may be included in the time interval in which two adjacent frames are acquired, the displacement of the movement unit (for example, two wheels), and the displacement of the camera relative to the movement unit.

In operation 1720, the analysis module 310 may obtain a first displacement associated with the movement unit based on the image data. In some embodiments, the first displacement associated with the movement unit may be a displacement of the center of the two wheels in a period of time. In some embodiments, the first displacement associated with the movement unit may be a displacement of a point within a period of time, and the point is configured with a navigation sensor. In some embodiments, the navigation sensor may be located at the center of the two wheels. In some embodiments, the time period may be a time interval in which the image sensor 810 acquires two frames.

In operation 1730, the analysis module 310 may obtain a second displacement associated with the image sensor 810 relative to the movement unit. In some embodiments, the second displacement may be a relative displacement of the image sensor 810 relative to the movement unit. In some embodiments, the image sensor 810 may be a camera.

In operation 1740, the analysis module 310 may determine a third displacement associated with the image sensor 810 based on the first displacement and the second displacement. In some embodiments, the third displacement may be a vector sum of the first displacement and the second displacement. In some embodiments, the third displacement may be a displacement starting value for determining an initial displacement.

Figure 17B:
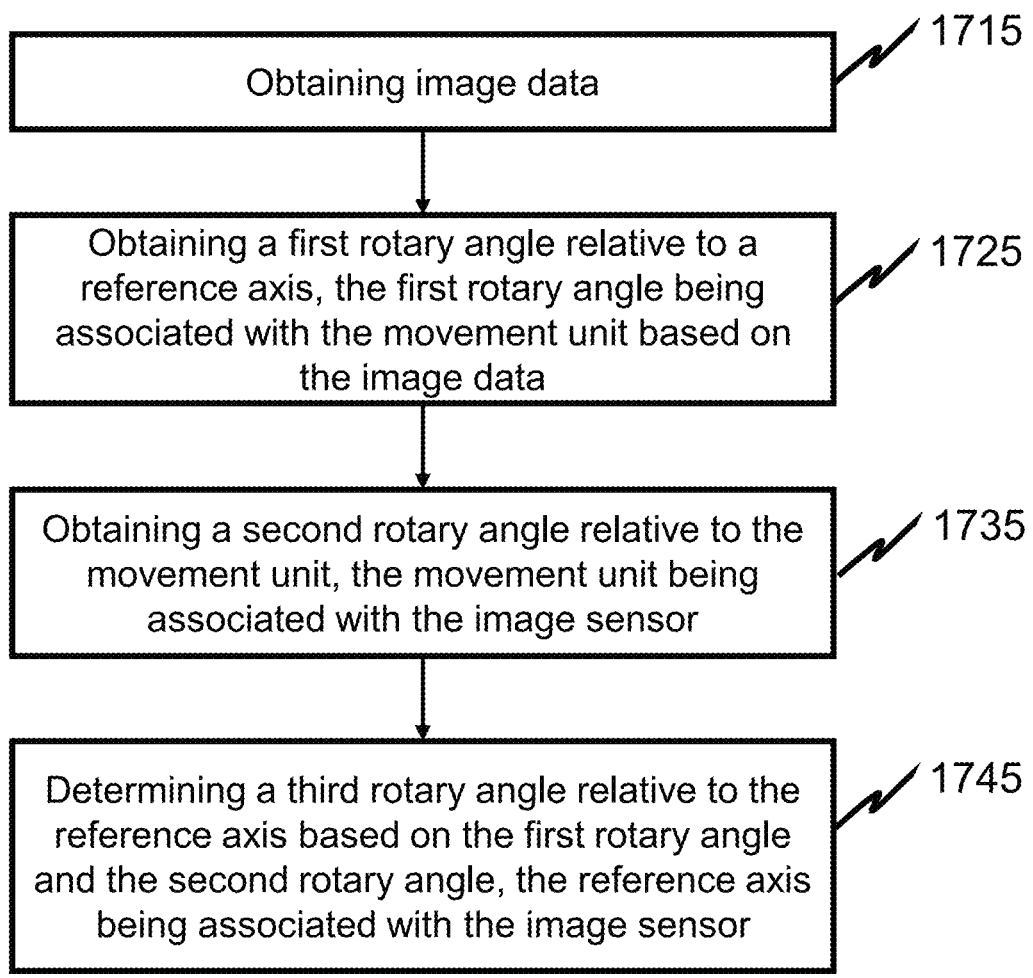
FIG. 17B is a flowchart illustrating an exemplary process for determining a robot posture according to an embodiment of the present disclosure.

During the movement of the intelligent robot 110, the holder needs to be controlled to obtain the precise posture of the intelligent robot 110. In some embodiments, the posture of the intelligent robot 110 may be controlled in the holder 930 by controlling the rotary angle of the shaft. According to some embodiments of the present disclosure, FIG. 17B is an exemplary flowchart for determining the posture of the intelligent robot 110. This process may be completed by the analysis module 310 according to the rotary angle of the axis of the holder 930.

In operation 1715, image data may be obtained by analysis module 310. As described in FIG. 17A, image data may include a frame, a displacement, and an initial depth. In some embodiments, image data may also include rotation information.

In operation 1725, the analysis module 310 may obtain a first rotary angle relative to a reference axis. The first rotary angle may be associated with a movement unit based on image data. In some embodiments, the first rotation angle of the reference axis associated with the movement unit may be obtained from the rotation information in the image data. In some embodiments, the first rotary angle may be an angle within a period of time. In some embodiments, the time period is a time interval at which the image sensor 810 acquires two frames.

In operation 1735, the analysis module 310 may obtain a second rotary angle relative to the movement unit over a period of time, the movement unit being associated with the image sensor. In some embodiments, the second rotary angle may be a relative rotational angle of the image sensor 810 relative to the movement unit. In some embodiments, image sensor 810 may be a camera.

In operation 1745, the analysis module 310 may determine a third rotary angle relative to the reference axis that is associated with the image sensor 810. In some embodiments, the third rotary angle may be determined according to the first rotary angle and the second rotary angle. In some embodiments, the third rotary angle may be a vector sum of the first rotary angle and the second rotary angle.

During the movement of the intelligent robot 110, the movement module 820 and the holder 930 may configure the sensor (group) 230 to obtain the information. In some embodiments, the sensor (group) 230 may be located in the carrier 1010 or in an intelligent mobile supported by the holder 930. In some embodiments, the movement module 920 and the holder 930 may require a full range of stability measures to obtain accurate and reliable information. The method on how to make the movement module 920 and the holder 930 balanced with respect to the horizontal plane will be described in detail in the description of FIG. 18.

Figure 18:
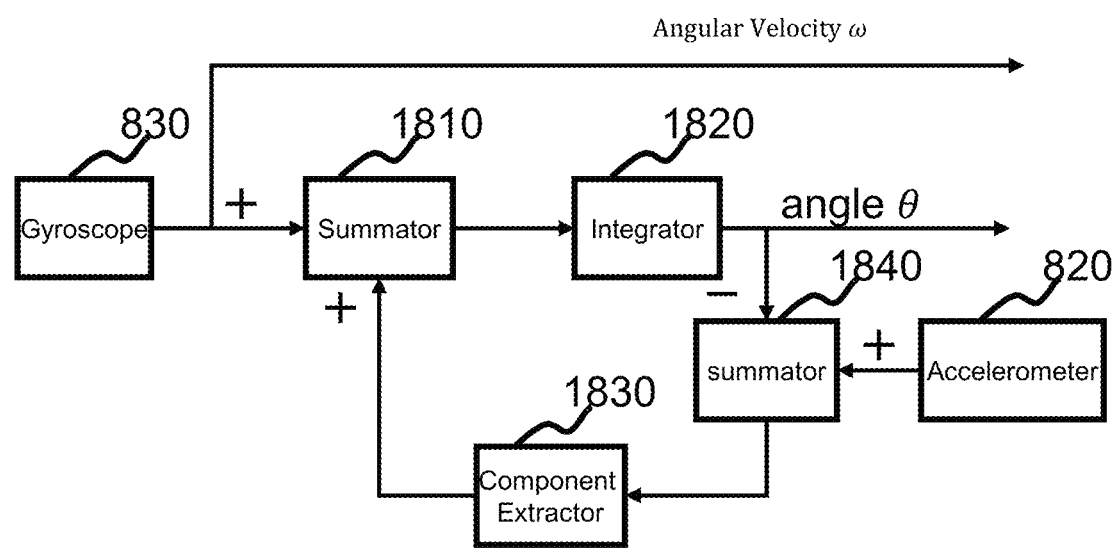
FIG. 18 is a schematic block diagram illustrating an exemplary process for determining the angle between the horizontal plane and the Z-axis by the gyroscope and the accelerometer according to some embodiments of the present disclosure.

According to some embodiments of the present disclosure, FIG. 18 is an exemplary block diagram of how the gyroscope and the accelerometer determine the angle between the horizontal plane and the Z-axis. In some embodiments, the horizontal plane may be the mounting surface of the carrier 1010, and the angle between the horizontal plane and the Z-axis may be determined according to the gyroscope data and the accelerometer data. In some embodiments, the horizontal plane may be the relative plane of the holder 930 detecting the holder 930 pitch angle.

The system block diagram shown in FIG. 18, the system may include summator 1810, integrate 1820, component extractor 1830, and summator 1840. The summator 1810, integrate 1820, component extractor 1830, and summator 1840 may form a feedback loop for determining the output angle. The integrator 1820 may obtain the angle between the horizontal plane and the Z-axis in each frame obtained by the image sensor 810. It is assumed that the image sensor 810 obtains the first frame at time t1 and the second frame at time t2. Then, at times t1 and t2, the gyroscope 830 and the accelerometer 820 may obtain angular velocity and angled information. In some embodiments, the feedback output angle $\theta_1$ associated with the first frame obtained at time t1 and the gyroscope data and accelerometer data obtained at time t2 may be used to determine the output angle $\theta_2$ associated with the second frame obtained at time t2.

First, the first frame's gyroscope data and accelerometer data may be processed at time t1. The integrator 1820 may generate an output angle associated with the first frame $\theta_1$. The accelerometer 820 may generate the first angle $\theta_1'$, summator 1840 may generate the second angle $\theta_1''$ according to the output angle $\theta_1$ and the first angle $\theta_1'$. In some embodiments, the second angle $\theta_1''$ may be obtained by subtracting the output angle $\theta_1$ from the first angle $\theta_1'$ vector. The component extractor 1830 may determine the compensation angular velocity $\omega_1''$ based on the second angle $\theta_1''$. In some embodiments, component extractor 1830 may be a differentiator.

Then, the second frame's gyroscope data and accelerometer data may be processed at time t2. The gyroscope 830 may generate angular velocity $\omega_2$. summator 1810 may generate corrected angular velocity $\omega_2'$ according to angular velocity $\omega_2$ and compensated angular velocity $\omega_1''$. In some embodiments, the corrected angular velocity $\omega_2'$ may be obtained by adding the angular velocity $\omega_2$ and the compensation angular velocity $\omega_1''$ vector. Finally, the integrator 1820 may output the angle $\theta_2$ associated with the second frame at time t2 based on the corrected angular velocity $\omega_2'$.

In some embodiments, the method described in FIG. 18 may be completed by the processor 210. For example, gyroscope data and accelerometer data may be transferred to the processor 210 via the API interface (for example, part of an intelligent mobile). The processor 210 may determine an output angle when each frame is obtained. In some embodiments, the angle between the horizontal plane and the Z-axis may be detected when each frame is acquired. The balance of the system on the horizontal plane may be maintained based on the real-time output angle associated with each frame.

Figure 19:
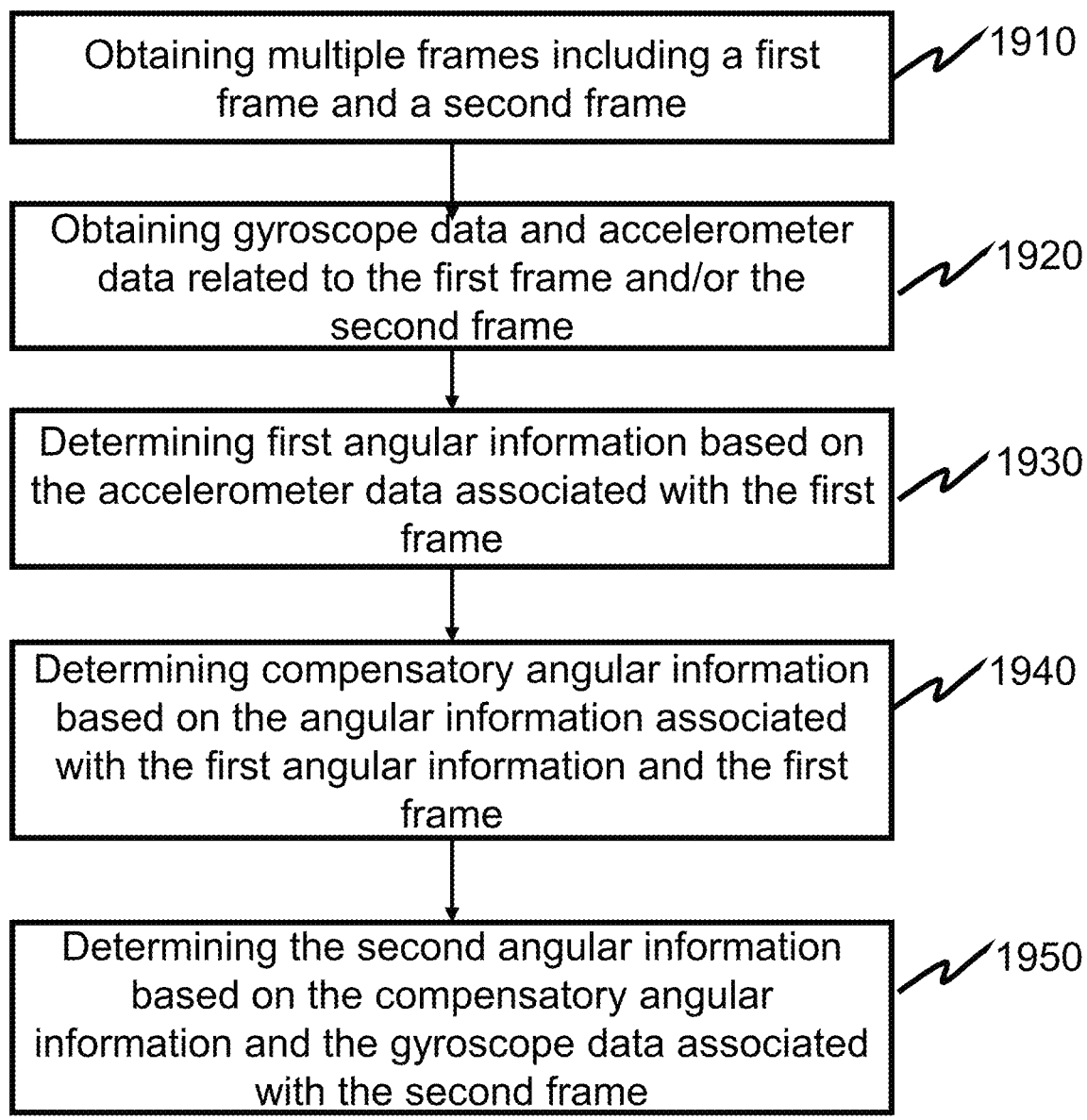
FIG. 19 is a flowchart illustrating an exemplary process for determining a corresponding angle of a reference frame according to some embodiments of the present disclosure.

FIG. 19 is an exemplary flow diagram of a flow 1900 of determining an angle associated with a frame. The flow 1900 is performed by the processor 210.

In operation 1910, the processor 210 may obtain multiple frames including the first frame and the second frame. In some embodiments, the first frame and the second frame may be captured by the image sensor 810 at intervals. For example, at time $t_1$, image sensor 810 takes the first frame. At time $t_2$, image sensor 810 takes a second frame. The time between $t_1$ and $t_2$ may be the sampling interval of image sensor 810.

In operation 1920, the processor 210 may obtain gyroscope data and accelerometer data associated with the first frame and/or the second frame. In some embodiments, gyroscope data and accelerometer data may include parameters such as angular velocity and angle.

In operation 1930, the processor 210 may determine first angular information based on the accelerometer data associated with the first frame. In some embodiments, the first angular information may include a first angle.

In operation 1940, based on the first angular information and the angular information associated with the first frame, the processor 210 may determine the compensatory angular information. In some embodiments, the angular information associated with the first frame may be an output angle associated with the first frame. In some embodiments, the first angular information may be processed by subtracting an output angle associated with the first frame. In some embodiments, the compensated angular information may be a compensated angular velocity. The compensated angular velocity may be determined by component extractor 1830 based on an operation that subtracts the output angle associated with the first frame from the first angular information.

In operation 1950, based on the compensatory angular information and the gyroscope data associated with the second frame, the processor 210 may determine the second angular information. In some embodiments, the second angle data may be an angle between a horizontal plane and a Z-axis detected by the processor 210 associated with the second frame at the time of shooting the second frame $t_2$.

As shown in FIGS. 18 and 19, the output angle associated with the second frame may be fed back to the output angle associated with the first frame. With this cyclic form and the gyroscope data and the accelerometer data, the output angle of each frame may be obtained by the processor 210. In some embodiments, the angle between the horizontal plane and the Z axis may exceed a certain threshold, and then generate a balanced control signal.

The method for maintaining the horizontal balance of the movement module 920 or the holder 930 is as shown in FIGS. 18 and 19. During the movement of the intelligent robot 110, sensors installed in the intelligent mobile held by the holder 930 may obtain the information. In some embodiments, the information may include image data, gyroscope data, accelerometer data, and data acquired from other sensors. In order to stably acquire the information for the second-type sensor 1240 in the intelligent mobile, it is necessary to maintain the horizontal balance by the processor 210. On the other hand, for the second-type sensor 1240 in an intelligent mobile supported by the holder 930, the road may be uneven and may not acquire the information stably. In some embodiments, the sensor in the intelligent mobile wants to obtain a stable information, and the balance of the vertical axis is also necessary.

FIG. 20 is a flow diagram of an exemplary method 2000 for adjusting the vertical displacement of the second-type sensor 1240 in an intelligent mobile. In some embodiments, the method may be executed by the processor 210, according to the control parameters generated by the intelligent robot control module 330, the dynamic Z buffer bar 1120 is controlled as shown in FIG. 11.

In operation 2010, the processor 210 may obtain the first displacement of the motor along the rotation axis. In some embodiments, the rotation axis may be the Z axis, and the first displacement may be a vector along the Z axis.

In operation 2020, the processor 210 may determine whether the displacement of the motor along the Z-axis is greater than a threshold. In some embodiments, the threshold may be a limit value within that the second-type sensor 1240 may stably acquire the information.

In operation 2030, when the displacement of the motor is greater than a threshold, the processor 210 may generate a first control signal to move the motor to an initial position. In some embodiments, the initial position may be a preset position suitable for obtaining information.

In operation 2040, the processor 210 may output a first control signal to the motor to cause the second-type sensor 1240 installed in the intelligent mobile to return to the initial position to obtain stable information.

In operation 2050, when the displacement of the motor is not greater than a threshold, the processor 210 may obtain a first acceleration along the rotation axis. In some embodiments, the acceleration may be obtained by the accelerometer 820 installed in the intelligent mobile.

In operation 2060, the processor 210 may generate a second acceleration based on the first acceleration. In some embodiments, the second acceleration may be the acceleration after the first acceleration is filtered.

In operation 2070, the processor 210 may determine a second displacement based on the second acceleration. In some embodiments, the second displacement may be calculated according to the integrated value of the second acceleration. In some embodiments, the second displacement may be a vector along the Z axis.

In operation 2080, the processor 210 may generate a second control signal to control movement of the motor based on the second displacement. In some embodiments, the second control signal may determine a remaining gap (remaining movable range) of a displacement according to the second displacement and the threshold, and then the processor 210 may control the sensor in the intelligent mobile to move along the Z axis.

In operation 2090, the sensor 210 may output a second control signal to the motor.

The present disclosure is described and illustrated with reference to the embodiments, and it is understood that those skilled in the field may make various modifications in form and detail without departing from the spirit and scope of the disclosure as defined in the appended claims and their equivalent description.

What is claimed is:
1. A system, comprising:
a movement module including a wheel, a carrier, and a first-type sensor, the first-type sensor configured to collect surrounding information;
a holder including a second-type sensor; and
a processor including an analysis module, a navigation module, and a control module, wherein
the processor is configured to:
communicate with the holder and the movement module, respectively;
obtain information from one or more of the first-type sensor and the second-type sensor, respectively, the information including image data, the image data including a plurality of video frames;
determine a destination and a location of the system;
build a map based on the information;
plan a route for the system based on the map;
determine control parameters for the system based on the route and the information; and
control a movement and an attitude of the system based on the control parameters, including:
determine, for each of the plurality of video frames, an angle between a horizontal plane and a Z-axis of the system associated with the each video frame, including:
obtain accelerometer data associated with a reference frame related to the each video frame;
obtain gyroscope data associated with the each video frame;
determine, based on the accelerometer data, a reference angle of the reference frame between the horizontal plane and the Z-axis of the system, and angular information associated with the reference frame;

determine compensatory angular information based on the reference angle and the angular information associated with the reference frame; and determine, based on the compensatory angular information and the gyroscope data associated with the each video frame, the angle between the horizontal plane and the Z-axis of the system associated with the each video frame;

determine whether the angle exceeds a threshold; and in response to determining that the angle exceeds the threshold, generate a balanced control signal.

2. The system of claim 1, wherein the processor communicates with the holder and the movement module, respectively, using an application program interface.

3. The system of claim 1, wherein the first-type sensor includes at least one of an accelerometer, a gyroscope, a sonar, an infrared distance sensor, an optical flow sensor, a lidar, or a navigation sensor.

4. The system of claim 3, wherein the first-type sensor includes a sonar and an optical flow sensor.

5. The system of claim 1, wherein the second-type sensor includes at least one of an image sensor, an accelerometer, a gyroscope, a sonar, an infrared distance sensor, an optical flow sensor, a lidar, or a navigation sensor.

6. The system of claim 5, wherein the second-type sensor includes an image sensor, an accelerometer, a gyroscope, and a navigation sensor.

7. The system of claim 1, wherein the information obtained from the one or more of the first-type sensor and the second-type sensor includes image data, gyroscope data, accelerometer data, position data, or distance data.

8. A method, comprising:

establishing communication between a processor and a holder, and between a processor and a movement module;

obtaining information from one or more of second-type sensor of the holder and first-type sensor of the movement module by the processor, respectively, the information including image data, the image data including a plurality of video frames;

determining a destination and a location of an intelligent robot by the processor;

obtaining, by the processor, a map based on the information;

determining, by the processor, a route from the location to the destination of the intelligent robot based on the map;

determining control parameters of the movement module and the holder based on the route and the information;

controlling a movement and an attitude of the intelligent robot based on the control parameters, including:

determine, for each of the plurality of video frames, an angle between a horizontal plane and a Z-axis of the system associated with the each video frame, including:

obtaining accelerometer data associated with a reference frame related to the each video frame;

obtaining gyroscope data associated with the each video frame;

determining, based on the accelerometer data, a reference angle of the reference frame between the horizontal plane and the Z-axis of the system, and angular information associated with the reference frame;

determining compensatory angular information based on the reference angle and the angular information associated with the reference frame; and determining, based on the compensatory angular information and the gyroscope data associated with the each video frame, the angle between the horizontal plane and the Z-axis of the system associated with the each video frame;

determine whether the angle exceeds a threshold; and in response to determining that the angle exceeds the threshold, generate a balanced control signal.

9. The method of claim 8, wherein the processor communicates with the holder and the movement module, respectively, using an application program interface.

10. The method of claim 8, wherein the first-type sensor includes at least one of an accelerometer, a gyroscope, a sonar, an infrared distance sensor, an optical flow sensor, a lidar or a navigation sensor.

11. The method of claim 10, wherein the first-type sensor comprises a sonar and an optical flow sensor.

12. The method of claim 8, wherein the second-type sensor comprises at least one of an image sensor, an accelerometer, a gyroscope, a sonar, an infrared distance sensor, an optical flow sensor, a lidar, or a navigation sensor.

13. The method of claim 12, wherein the second-type sensor includes an image sensor, an accelerometer, a gyroscope, and a navigation sensor.

14. The method of claim 8, wherein the information obtained by the one or more of the second-type sensor of the holder and the first-type sensor of the movement module comprises image data, gyroscope data, accelerometer data, position data, or distance data.

* * * * *